US010565095B2

(12) United States Patent
Malla et al.

(10) Patent No.: US 10,565,095 B2
(45) Date of Patent: Feb. 18, 2020

(54) HYBRID TESTING AUTOMATION ENGINE

(71) Applicant: Syntel, Inc., Troy, MI (US)

(72) Inventors: Prasanth Kiran Malla, Visakhapatnam (IN); Padmanabhan Balasubramanian, Chennai (IN); Komali Botchu, Vishakapatnam (IN); Himanshu Halder, Howrah (IN); Balaji Munusamy, Chennai (IN)

(73) Assignee: SYNTEL, INC., Troy, MI (US)

( * ) Notice: Subject to any disclaimer, the term of this patent is extended or adjusted under 35 U.S.C. 154(b) by 0 days.

(21) Appl. No.: 15/843,553

(22) Filed: Dec. 15, 2017

(65) Prior Publication Data
US 2018/0173606 A1 Jun. 21, 2018

Related U.S. Application Data

(60) Provisional application No. 62/434,621, filed on Dec. 15, 2016.

(51) Int. Cl.
*G06F 11/36* (2006.01)
*G06N 20/00* (2019.01)

(52) U.S. Cl.
CPC ........ *G06F 11/368* (2013.01); *G06F 11/3684* (2013.01); *G06F 11/3688* (2013.01); *G06N 20/00* (2019.01)

(58) Field of Classification Search
CPC .............. G06F 11/368; G06F 11/3684; G06F 11/3688; G06N 99/005; G06N 20/00
USPC .......................................................... 717/131
See application file for complete search history.

(56) References Cited

U.S. PATENT DOCUMENTS

| | | | |
|---|---|---|---|
| 7,603,367 B1 * | 10/2009 | Kanter | G06F 16/00 |
| 2002/0078022 A1 * | 6/2002 | Lawton | G06F 16/951 |
| 2003/0061280 A1 * | 3/2003 | Bulson | H04L 29/06027 |
| | | | 709/203 |

(Continued)

OTHER PUBLICATIONS

Kung et al, "An Object-Oriented Web Test Model for Testing Web Applications", [Online], 2000, pp. 111-120, [Retrieved from internet on Feb. 2, 2019], <https://www.cs.du.edu/~sazghand/background_chap_papers/An%20Object-Oriented%20Web%20Test%20Model%20for%20Testing%20Web%20Applications.pdf> (Year: 2000}.*

(Continued)

*Primary Examiner* — S. Sough
*Assistant Examiner* — Zengpu Wei
(74) *Attorney, Agent, or Firm* — Miles & Stockbridge, P.C.

(57) ABSTRACT

A hybrid testing automation engine tests a main application using a client browser and includes an object learning module to parse code describing a web page destined to be rendered by the client browser to identify predetermined types of page elements and associate therewith a respective plurality of identification means to locate such elements and store such data in an object repository. A test data manager module manages test data in a hierarchy including a global level, a scenario level, and a step level and store such data in a test data repository. A scripting module facilitates script generation but also includes the capability of recording steps (actions) for playback during testing. A test execution module executes a test scenario including the playback of recorded steps and/or execution of scripts with reference to the object repository and the test data repository.

16 Claims, 16 Drawing Sheets

(56) References Cited

U.S. PATENT DOCUMENTS

| | | | | |
|---|---|---|---|---|
| 2012/0110063 | A1* | 5/2012 | Prasad | G06Q 10/06 709/203 |
| 2012/0290920 | A1* | 11/2012 | Crossley | G06F 11/3664 715/234 |
| 2013/0191306 | A1* | 7/2013 | Wilkinson | G06Q 10/10 705/348 |
| 2014/0109037 | A1* | 4/2014 | Ouali | G06F 8/10 717/105 |
| 2015/0212927 | A1* | 7/2015 | N'Gum | G06F 11/368 717/125 |
| 2018/0011780 | A1* | 1/2018 | Aggarwal | G06F 11/3672 |
| 2018/0095866 | A1* | 4/2018 | Narayanan | G06F 11/3684 |
| 2018/0123934 | A1* | 5/2018 | Gissing | H04L 67/02 |

OTHER PUBLICATIONS

Mesbah et al, "Invariant-Based Automatic Testing of Modern Web Applications", [Online], 2011, pp. 1-19, [Retrieved from internet on Feb. 2, 2019], <http://citeseerx.ist.psu.edu/viewdoc/download?doi=10.1.1.637.907&rep=rep1&type=pdf> (Year: 2011).*

Alalfi et al, "Modeling methods for web application verification and testing: State of the art", [Online], 2008, pp. 1-32, [Retrieved from internet on Feb. 2, 2019], <http://cs.queensu.ca/home/cordy/Papers/ACD_STVR_Survey.pdf> (Year 2008).*

Jensen et al, "Server Interface Descriptions for Automated Testing of JavaScript Web Applications", [Online], 2013, pp. 510-520 , [Retrieved from internet on Oct. 1, 2019], <http://delivery.acm.org/10.1145/2500000/2491421/p510-jensen.pdf?ip=151.207.250.22&id=2491421&acc=ACTIVE%20SERVICE&key=C15944E53D> (Year: 2013).*

Bau et al, "State of the Art: Automated Black-Box Web Application Vulnerability Testing", [Online], 2010, pp. 1-14, [Retrieved from internet on Oct. 1, 2019], <http://crypto.stanford.edu/~jcm/papers/pci_oakland10.pdf> (Year: 2010).*

Mikael Barbero, About Hudson (7 pgs.), retrieved from https://archive.org/web/ (Wayback Machine) with date of Sep. 7, 2015.

Sami Salkosuo, Debug and tune applications on the fly with Firebug: Save time when you monitor, analyze, and edit live Web pages (16 pgs.), IBM, dated May 6, 2008.

HP QuickTest Professional software: Data sheet (4 pgs.), Hewlett-Packard, dated Oct. 1, 2008.

XPath-based Parsing Framework (XPaF) (2 pgs.), GitHub: google/xpaf, retrieved from https://archive.org/web/ (Wayback Machine) with date of Jun. 4, 2015.

F12 Developer Tools (2 pgs.), retrieved from https://archive.org/web/ (Wayback Machine) with date of Jun. 30, 2015.

Maven (2 pgs.), The Apache Software Foundation, retrieved from https://archive.org/web/ (Wayback Machine) with date of Nov. 9, 2015.

Selenium IDE (4 pgs.), SeleniumHQ, retrieved from https://archive.org/web/ (Wayback Machine) with date of Nov. 30, 2015.

JUnit Lambda (1 pg.), retrieved from https://archive.org/web/ (Wayback Machine) with date of Dec. 12, 2015.

TestNG: Documentation (22 pgs.), retrieved from https://archive.org/web/ (Wayback Machine) with date of Dec. 12, 2015.

* cited by examiner

User Navigating to Opportunity Screen with more than 100 fields — 238

— 242

Opportunity Edits TestAme... X
https://americanexpress.com
Most Visited · Getting Started · American Express Inc.

Opportunity Edit     Save  Save & New  Cancel

Products Offered & Discussed                    Products Discussed

SimplyCash Plus Offered? ☐

Opportunity Information — 244

Opportunity Name [Test]                    Set MZP ID [ ]
Account Name [Test] 🔍                    Lincoln ⊙ ☐
PCH# [ ]                                   Cross Sell? ☐
Phone [7654321098]                         CNT_MZP_ID [ ]
Business Phone Ext [ ]                     Tmid [ ]
Company Name [ ]                           Opportunity Owner [BPTUserSysAdmin]
Contact Title [ ]                          HIROC ☐
Rating [Hot ▼]                             Close Date [3/31/2017] (7/28/2017)
Intend [--None--]                          Campaign End Date [ ] (7/28/2017)
Spend Stage [ ]                            Expected Closed Date [5/30/2018] (7/28/2017)
EncryptedID [YZLBSmny1Cje77zWXe]           Stage [Contact]  Chat

HYBRID TESTING AUTOMATION ENGINE

CROSS-REFERENCE TO RELATED APPLICATIONS

This application claims the benefit of U.S. provisional application No. 62/434,621, filed 15 Dec. 2016 (the '621 application), which '621 application is hereby incorporated by reference as though fully set forth herein.

BACKGROUND a. Technical Field

The present disclosure relates to a testing automation engine.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Software applications in the process of development or during enhancements can benefit or may in fact be required to undergo rigorous quality assurance testing before rolled out for usage. These testing activities can be done both manually as well as in an automated fashion. Automated testing helps alleviate laborious repeated manual tasks thereby reducing human intervention and effort reduction. It would be advantageous to provide an automation testing framework that is easy to adapt, easy to use (e.g., presents a less complex user interface), and delivers value.

The automated testing also must be effective to test (i.e., validate) the software's functionality in end to end scenarios, especially with web applications intact across different browser types and also with different web services, such as database (DB) services, file transfer protocol (FTP) services, connectivity with mainframe systems, access via different client devices such as smart devices, tablets, and the like.

Known test automation approaches, generally, may be carried out by a key word driven approach or test data driver approach or a hybrid mix of both key word and test data driven approaches—in a descriptive manner. There are known testing frameworks that support record and playback, but due the known limitation of record and playback, descriptive frameworks are more maintainable and adapted with a long term perspective.

Evolution of software development techniques have also revealed shortcomings of existing test automation approaches. For example, a known software development cycle was implemented in discrete, sequential stages, such as preliminary and detailed design, coding (implementation), verification, and maintenance (i.e., also sometimes referred to as a waterfall model of development). However, more recent approaches, such as a so-called agile model of software development involves an approach where the development and testing are carried out in an incremental fashion. Thus, any shortcomings exhibited in traditional testing automation—which were developed with a waterfall model approach with major software releases in mind—are now getting multiplied for software development under an agile model of development. A reason for this is with a traditional waterfall model, the automation of the testing is carried out after one round of (manual) testing, after which any test application changes are typically minimal or null. Hence the test automation impact due to regression is also very minimal and acceptable in nature. Whereas in contrast, because of the evolution in software development to the agile model, due to its incremental development and testing, the automation process, such as scripting, which was previously done once, is now a recurring activity. Given this, in a fixed velocity with a fixed timelines with this incremental development, a testing automation framework to absorb these challenges becomes more critical for the success criteria for automation deliverables.

The foregoing discussion is intended only to illustrate the present field and should not be taken as a disavowal of claim scope.

SUMMARY

In an embodiment, a computer system according to an embodiment includes an electronic processor and testing automation framework logic stored in memory for execution by the electronic processor configured to test a main application-under-test by way of a client application in communication with the application-under-test. The testing automation framework logic further includes an object learning module, a test data manager module, a scripting module, and a test execution module. The object learning module is stored in memory for execution by the electronic processor and is configured to parse code describing a web page destined to be rendered by the client application in order to identify predetermined types of elements and associate therewith a respective plurality of identification means for identifying the elements in the code. The object learning module is further configured to organize the identified elements with the respective, associated identification means as an object set for storage in an object repository. The test data manager module is stored in memory for execution by the electronic processor and is configured to produce a test data set. The scripting module is stored in memory for execution by the electronic processor and is configured to generate at least one script that describes defined test actions with reference to the stored object set and the test data set. The test execution module is stored in memory for execution by the electronic processor and is configured to execute the at least one script to thereby test the application-under-test wherein the test execution module is configured to use, for at least one element in the object set, a plurality of the associated identification means, the test execution module also being configured to generate a report with the results of the test.

In an embodiment, the predetermined types of elements may include elements where a user action would need to be simulated by the test.

In an embodiment, the object learning module is further configured to automatically learn the elements in the code without user input or intervention.

In an embodiment, the object learning module is further configured with a user interface that allows a user to designate a desired element with, for example, the application under test like a web page/mobile application, to thereby define a spied element, wherein the object learning module is further configured to automatically determine attributes of the spied element. In a further embodiment, the object learning module is further configured to validate each of the attributes of the spied element for uniqueness, for example, for the current page of the application under test. In a still further embodiment, the object learning module is further configured to set or reset, for each of the attributes of the spied element, a respective uniqueness flag.

In an embodiment, the user interface is further configured to allow the user to select, for the spied element, a plurality of attributes in combination so as to produce a multi-conditioned locator. In a further embodiment, the multi-conditioned locator comprises an XPath descriptor.

In an embodiment, the object learning module is further configured with a user interface configured to receive from a user at least one search criteria selected from (i) a keyword and (ii) an exact value associated with an attribute of an element, wherein the object learning module is further configured to parse the code of the web page and output a listing of all elements thereof meeting the search criteria, and wherein the object learning module is further configured to denote a respective uniqueness, for example, with the page or test application for each attribute of each listed element. In a further embodiment, the user interface is configured to receive from the user a selection of a region of the web page designating which elements to analyze, and wherein the object learning module is configured to determine the user-designated elements.

In an embodiment, the test data manager module is configured to established a hierarchy comprising a global level, scenario level, and a step level and wherein the test execution module is configured to enforce the hierarchy during execution of the test.

In an embodiment, the code describing the web page comprises a first code, and wherein the scripting module is configured to automatically parse the first code describing the web page to generate a second code reflecting the page elements and user actions to thereby form the script that is configured to drive the execution of the test. In a further embodiment, the web page is a first web page and the script is a first script, further comprising a second web page, wherein the scripting module is configured to automatically parse the first code associated with the second web page to generate second code reflecting the page elements and user actions associated with the second web page thereby defining a second script, the first and second scripts being separate so as to define modular scripts.

In an embodiment, an intended element in the object set has a plurality of associated identification means in a first rank order, wherein the test execution module according to the script, upon a failure to get the intended elements using the first identification means, is configured to increment through remaining identification means associated with the intended element in rank order until the test execution module is successful in getting the intended element. In a further embodiment, the test execution module is configured to re-rank the plurality of identification means associated with the intended element into a second rank order where the successful identification means is ranked higher in the second rank order than in the first rank order so as to reduce the chance of failure in subsequent testing and improve consistency. In a still further embodiment, the test execution module is configured to check for new values for those identification means where the test execution module failed to get the intended element, and to update the object set with the new values for those identification means where the test execution module failed to get the intended element.

In an embodiment, the computer system further includes means for recording user steps interacting with, for example, said test application in a script-less fashion, wherein said test execution manager is configured to playback said recorded steps during testing. The computer system further includes means for converting the recorded steps into Business Process Model and Notation (BPMN) standard notation.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIGS. 10A-10B is a simplified screen display showing the page component builder portion of FIG. 8 instantiated on the target page of the target application, in an embodiment.

DETAILED DESCRIPTION

Figure 1:
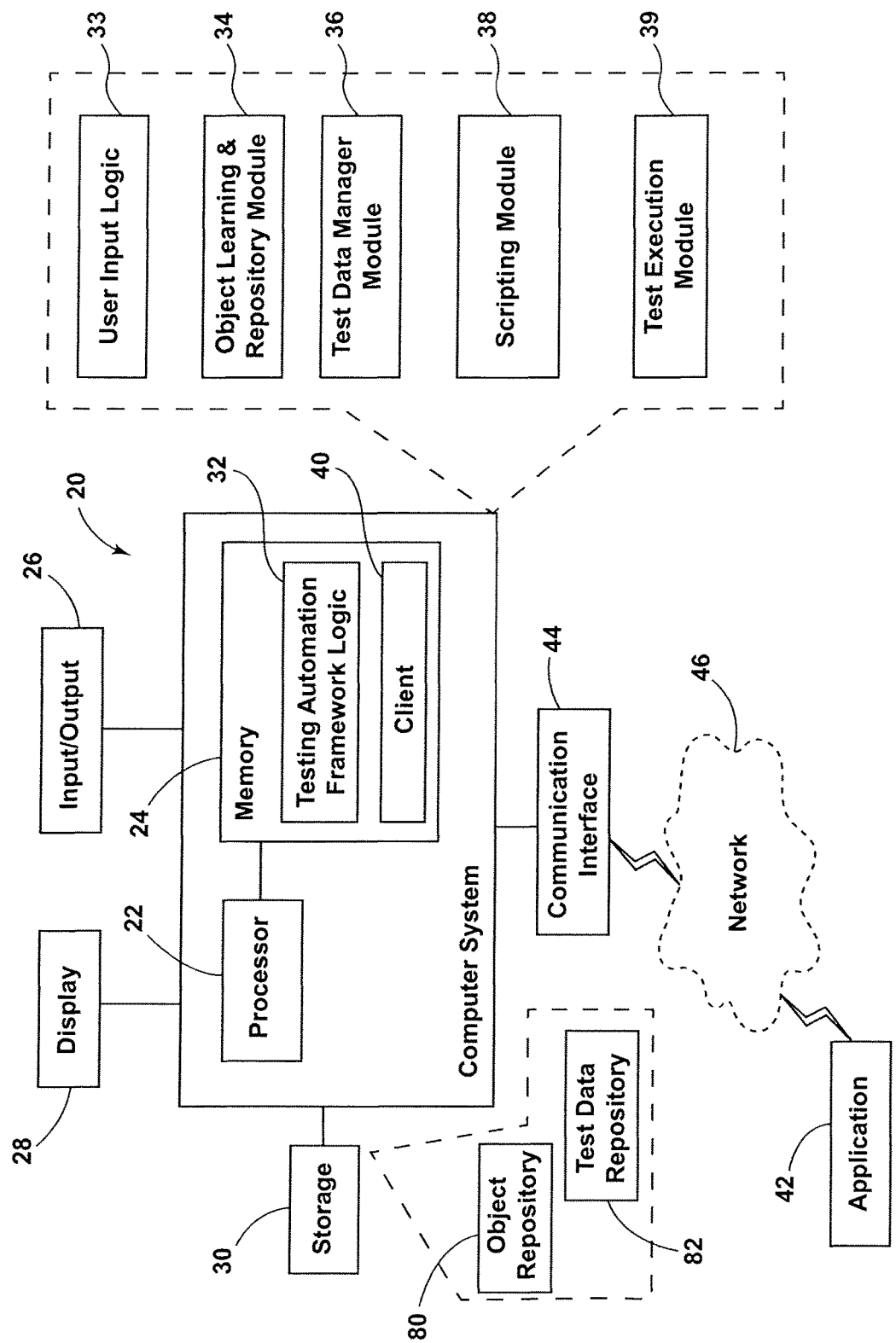
FIG. 1 is simplified block diagram of a hybrid testing automation engine according to an embodiment.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Below is an overview of the challenges and problems associated with testing automation practices. Automation frameworks can be configured to store distinct resources, like test data, element details, and scripts, as developed by a user such as a test automation engineer. Typically, upon initiation of the test scenarios at run time, the test data and element details are consumed from the respective resources. These resources are static place holders to store the data and retrieve the data but typically may not afford any additional features to ease the execution or maintenance. In order to sign off on (i.e., approve of) a test case with an automation framework, a number of core activities are typically performed by the test automation engineer, as set forth below with approximate typical timelines for an average test case.

Learning of the Objects and Maintenance with an Object Repository:

This category is where a test automation engineer may spends about 30% of his/her overall effort, to inspect the object with the test application to learn its unique properties. For a typical, considered test case this would be an approximate effort of around three hours.

More specifically, in order to simulate an action like type, click, or verification, the target object of the test application would need to be learned. It should be understood that this activity may be tedious and laborious for the test automation engineer to understand which parameter of the given element is unique and static. Additionally, the identification means being for example, the id, name, CSS path, XPath is scripted and the value/property of the object is maintained with the object repository with a key reference.

Scripting.

The test automation engineer in this category would detail the identification means as part of scripting with parameterized object properties and associate a user action to be simulated with intended test data. In addition, it should be appreciated that it standard/qualitative logging, reporting and exception handling may also need to be implemented. This activity may typically occupy about 30% of overall effort, which could be three hours.

Test Data.

As part of this activity, the test automation engineer would be parameterizing the data required as part of a given test case. This activity may take about 10% of the overall effort, for example, leading to about one hour of time.

Dry Run and Stabilization.

As part of this activity, the above-mentioned developed scripts would be executed to ensure synchronization between the script and the application-under-test in order to have consistent results. This is a most critical task wherein object learning and scripting can influence the performance as well as the outcome quality. This activity may take about 30% of the overall effort, which could be about one hour of time.

In the light of the above description of activities for a considered sample test case of about average complexity, an exemplary overall time investment in order to sign off on a test case may be about ten hours. As mentioned, however, a software application can undergo changes either due to the incremental nature of the development process itself, like as described above for the agile model, or such changes can be due to requests for new features or enhancements to the existing feature. In either case, such changes may lead to the need for maintenance of the earlier automated test cases. At a high level, the changes in the test cases may be split into a couple of categories wherein about 50% could be due to object property/structural changes with the presentation layer and the other 50% could be due to additional intermediate actions/screens. It should be appreciated that this sort of impact due to changes can result in a maintenance minimum of about 50% of the initial scripting effort, or in other words about five hour in the described example test case.

Hence the delivery teams put in lot of effort into building these resources and scripts and then in maintaining the same, especially when the application-under-test is under incremental development (Agile model) or is otherwise undergoing constant changes from time to time—the problem updating/maintaining gets magnified exponentially from sprint to sprint (i.e., timeboxed development effort).

With this context, potential shortcomings of conventional approaches can be identified, as will be set forth below for each of the activities already described above.

Learning of the Objects and Maintenance with Object Repository (Problems).

As part of a first time scripting three to four hours per test case of an average complexity would be spent towards the object learning. If this activity is not dealt with in an efficient manner, this activity might even lead to relatively increased efforts, for example, due to late identification problems leading high turn around, which includes root cause analysis and relearning. Thus, efficiency and accuracy/completeness are paramount.

There are few conventional recording tools available in market that can facilitate the test automation engineer in the effort to capture the basic properties of the given simple straight forward objects. However, in the case of dynamic objects with the test application, use of such tools would not be efficient. In this regard, a dynamic object may be an element in a page whose attributes and/or characteristics would vary time to time each time the application is loaded.

In order to carry out this activity with efficiency, typically leads to manual approach and in turn this usually requires rich insight of automation techniques in order to deal with dynamic objects. However, the proficiency of the individual involved varies from individual to individual. Additionally, it should be anticipated that due to the demand and supply mismatch, usually any given team includes a mix of individuals of varied proficiency, which in turn leads to a few trial and error modes of learning, which learning is highly error prone and less consistent over period of time due to the ongoing changes to the application.

Even after learning with a great effort, the traditional frameworks are featured to hold properties of the subject object but not with the associated identification means. Hence that is addressed as part of scripting. However, as a consequence of this approach, the identification means is typically hard coded and in the event of a failure with the current means associated with the respective property, the test automation object repository would need to be updated from time to time.

As part of maintenance of the automated test cases, the individual may spend approximately two to three hours per test case of average complexity. This effort breaks down into an initial effort, which may address failures for example, which in turn can involve determining that the failure is not due to application defect, but due to object property changes. A subsequent effort then involves navigating to the intended screen to obtain the required data to manually trace the changes to the object properties and thereafter updating the test automation object repository.

As mentioned above, despite knowing (after the initial effort) that the failure is due to an object property change only, still script modifications might be needed due to new identification means discovered as a result of the current object learning activity. These changes (script updates) would require additional efforts.

Scripting (Problems).

Normal record/play back test automation frameworks lack the reusability of a given test case with different test data combinations and also suffer from high maintenance due to hardcoded test data of object properties. For example, in the case of any property change, all the scripts would be required to be updated manually, as there would not be any grouping of steps and reused with any test cases.

Descriptive automation frameworks, on the other hand, have a certain degree of reusability, which provides a better maintenance capability compared to record/play back approaches. As part of this activity, test automation engineers, based even on an entry level proficiency, could leverage some recording tools to capture sequence of actions and object information, which in turn can be translated into descriptive code that exhibits a higher degree of reusability in place. A highly proficient test automation engineer would take relatively less time over record and translate with rich insight of run time exception and possible synchronization issues will be addressed even in early efforts.

This scripting effort predominantly includes object property retrieval from an object repository and means of identification specified as part of the script, and can also include test data reference, logging, reporting and exception handling as well.

Test Data Preparation and Data Exchange (Problems).

Traditional test automation frameworks, like the test data driven and hybrid frameworks mentioned above, will involve subsequent steps of automation with data passed by parameters. This approach leads to high maintenance due to the high impact in which every time parameters are refactored due to change in input parameters. Exchange of information/data from one step to the other makes this phase critical and also to great extent becomes challenging to have this information operating with integrity in event of running in parallel.

Dry-Run and Stabilization of the Scripts (Problems).

Test automation frameworks provide the ability to manage the loading of objects and test data exchange through descriptive programming and this is where the quality of the deliverables depends highly on the individuals involved. For example, if the individual does not have a rich background automation can leads to unanticipated run time exception(s) and also integration issue(s) to execute the scenario from end to end. These problems in turn lead to low productivity to signoff of any given test case (or cases).

Evolution of software development techniques have also revealed the above-mentioned shortcomings of existing test automation approaches. For example, a known software development cycle was implemented in discrete, sequential stages, such as preliminary and detailed design, coding (implementation), verification and maintenance (i.e., also sometimes referred to as a waterfall model). However, more recent approaches, such as a so-called agile model of software development involves the development and testing being carried out in an incremental fashion. Thus, any shortcoming exhibited in traditional testing automation that were developed with a waterfall model based software releases in mind are now getting multiplied in an agile model of software development. A reason for this is with a traditional water fall model, the automation of the testing is carried out after one round of testing, after which any test application changes are minimal or null. Hence the test automation impact due to regression is also very minimal and acceptable in nature. Whereas in contrast, because of the evolution in software development to the agile model, due to its incremental development and testing, the automation process, such as scripting, which was previously done once, is now a recurring activity. Given this, in a fixed velocity with a fixed timelines with this incremental development, a testing automation framework to absorb these challenges becomes more critical for the success criteria for automation deliverables.

Having the above-described challenges in mind for each of the phases of test automation, solutions are herein provided to address these challenges both individually and in integration, in order to at least ease the initial scripting efforts to improve the initial productivity as well as, at the same time, put in place a framework that can substantially reduce the subsequent maintenance efforts (e.g., absorb up to 60% of maintenance efforts), especially as may be expected in agile model development approach. In embodiments, solutions may involve auto learning (e.g., test case building) and auto recalibration (enabling system to diagnose run time changes and to recalibrate with no user/manual intervention wherever possible), as described in greater detail below.

Referring now to the drawings wherein like reference numerals are used to identify identical or similar components in the various views, FIG. 1 is a simplified block diagram view of an computer system 20 for providing a hybrid testing automation engine or framework, in an embodiment. Computer system 20 is configured, for example only through programming with a set of instructions, to perform any one or more of the functions, method, and/or tasks as described herein. The computer system may be a personal computer, a notebook computer, a server, a tablet computer, a personal digital assistant ("PDA"), a smartphone, or any other computing machine or collection of computing machines capable of executing a set of instructions to perform as described for computer system 20.

The computer system 20 includes an electronic processor 22 and a memory 24, a variety of input/output devices generally represented by input/output block 26 and may include a display 28 for example, as well as non-transitory memory, shown as a storage block 30 (which may include a local disk drive but may further include an object repository 80 and a test data repository 82 which comprise conventional database management systems that can be connected to in a conventional manner).

Processor 22 may comprise a central processing unit (CPU) of conventional construction and my comprise plural processors acting in concert. Processor 22 generally may include processing capabilities as well as an input/output (I/O) interface through which processor 22 may receive a plurality of input and generate a plurality of outputs. Memory 24 is provided for storage of data and instructions or code (i.e., software) for processor 22. Memory 24 may include various forms of non-volatile (i.e., non-transitory)

memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

Although not shown, the system 20 operates according to a supporting operating system, for example only, Microsoft Windows (e.g., 32-bit and/or 64-bit versions), variants of Linux, Apple Mac OS X. In an embodiment, the instant test automation engine or framework can also be used to test applications under test executing on mobile platforms as well such as Android or IOS compatible mobile devices.

In an embodiment, the test automation framework logic 32 may be implemented in a Java programming environment and in such case may require supporting Java software such as Java Development Kit (e.g., JDK 1.7) and Java Runtime executable (JRE 7 or newer). It should be understood, however, that the instant teachings are not so limited and may be implemented in other development environments.

Memory 24 stores executable code in the form of testing automation framework logic 32, which is configured to control the operation of system 20. The testing automation framework logic 32, when executed by processor 22, is configured to perform a variety of functions as will be described herein. In an embodiment, the testing automation framework logic 32 may include user input logic 33, an object learning and repository module 34, a test data manager module 36, a scripting module and driving engine module 38, and a test execution module 39.

It should be understood that for the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

The system 20 may further include client application program 40, such as a web browser, through which an application-under-test, such as application 42, may be accessed and exercised and tested. In an embodiment, system 20 may include a communication interface 44, for example a network interface, through which communications may occur over a network 46, which may be a local area network (LAN), wide area network (WAN), a private network or the public internet, for example only. In embodiment, the client browser may comprise any one of a variety of commercially available application programs such as current versions of Microsoft Internet Explorer (e.g., version 11, 10, 9, 8, 7, and 6), Mozilla Firefox, Google Chrome, Apple Safari, and Opera (e.g., version 12.x).

The system 20, in an embodiment, is configured to process business components rather than just the overhead of managing the test automation activities. For example, the system 20 in operation provides functionality for object identification (e.g., through object learning and repository module 34), test data management (e.g., through test data manager module 36), test case/plan organization, logging, and reporting (e.g., through scripting module and driving engine module 38 and test execution module 39).

Before proceeding to the detailed description of an embodiment of an automated testing engine, a brief overview description of the general environment and context will be first set forth. As shown in FIG. 1, a client application 40 such as a web browser provides a user with a generally standardized way of accessing and using a web application 42 over a network 46. As known, the client 40 and the application 42 exchange messages such as a request message sent by the client 40 to the application 42 and a response message sent by the application 42 to the client 40. The client 40 acts as an interface to the application 42 and may provide a user interface that that allows the user to take a number of actions such as clicking on a button, making a selection according to any kind of well-known web controls such as a drop-down menu, radio button, etc., and enter data, just to name a few. The client 40 allows the user to navigate a target application under test to reach a target web page and then perform conventional activities which are to be tested. The client 40 in general allows the user to engage with the target application as an end user would.

As used herein the term object (e.g., as in the learning of objects, the object repository, etc.) refers to the various elements that may be found on a web page, and which may include text, graphics, URL's, scripts, and the like. These objects may be learned from an analysis of the code that describes the web page, such as the HTML code. As already described, significant resources can be involved in learning these objects, their properties and associated values. During testing, the test automation engine will need to locate such objects in order to carry out the test automation. In an embodiment described herein, the object learning module is configured to identify and store multiple identification means associated with an object. For example, one way to identify an object is locating by id which can be used when an element's id attribute is known. Another way to identify an object is locating by Name, for example, to locate an element (e.g., perhaps the first one) with a matching name attribute. Another way to identify an object is locating by CSS path (i.e., Cascading Style Sheets path), which as is known is a way to describe the rendering of HTML and XML documents, as more fully set forth in the World Wide Web Consortium (W3C) web site w3.org. A still further way to identify an object is locating by XPath (XML Path Language), a language for addressing parts of an XML document, as more fully set forth in the W3C web site w3.org. In any event, suffice to say, there are multiple ways for identification of a page element, herein referred to as identification means for identifying and locating an element in the code describing a web page. Learning and documenting multiple identification means is a mechanism to reduce runtime failure during automated testing, in an embodiment.

Figure 2:
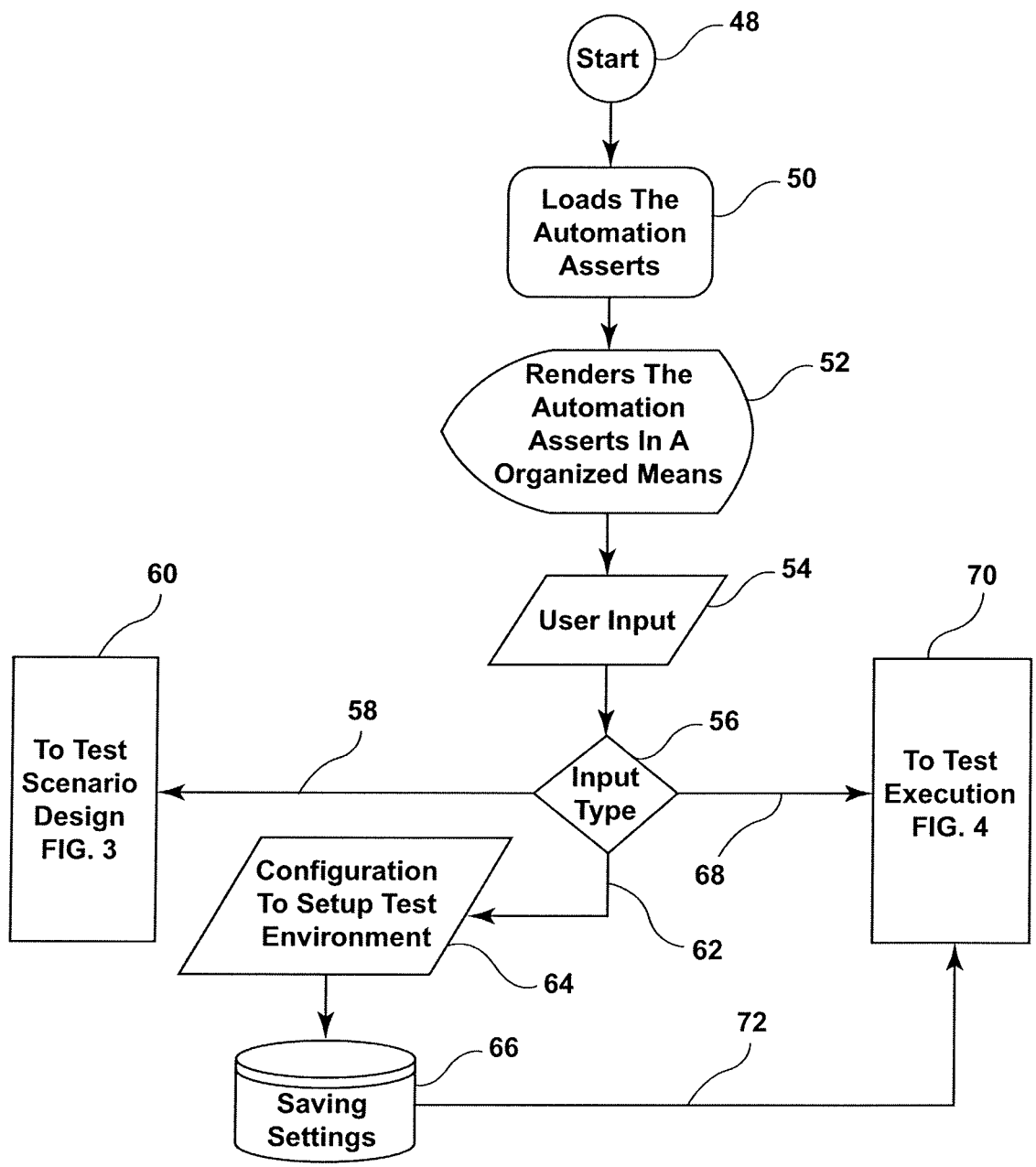
FIG. 2 is a flowchart diagram showing operation of input logic as shown in block form in FIG. 1, in an embodiment.

FIG. 2 is a simplified flowchart of input logic as executing in system 20 illustrating the operation of test automation framework logic 32. The flowchart begins at 48 and proceed to block 50 where logic 32 is configured to load the automation asserts (assertions) into memory, for example.

The operation proceed to block 52 where logic 32 is configured to render the automation asserts in an organized manner. The operation proceeds to block 54 where the logic 32 via input logic (not shown in FIG. 1) obtains user input which is evaluated at decision block 56. The user may opt for one of three modes of operation, namely, a first mode that involves a test scenario design, a second mode that involves a configuration setup for the test environment, and a third mode that involves execution of the automated test. When the block 56 determines the user input corresponds to the first mode, operation flows along path 58 to the test scenario design block, which is shown in greater detail in FIG. 3. When the block 56 determines the user input corresponds to the second mode, operation flows along path 62 to configuration block 64 configured to setup the test environment. The configuration settings are stored in saved setting data storage 66. When the block 56 determines the user input corresponds to the third mode, operation flows along path 68 to the execution/driving engine 70, which is shown in greater detail in FIGS. 4A-4B.

Figure 3:
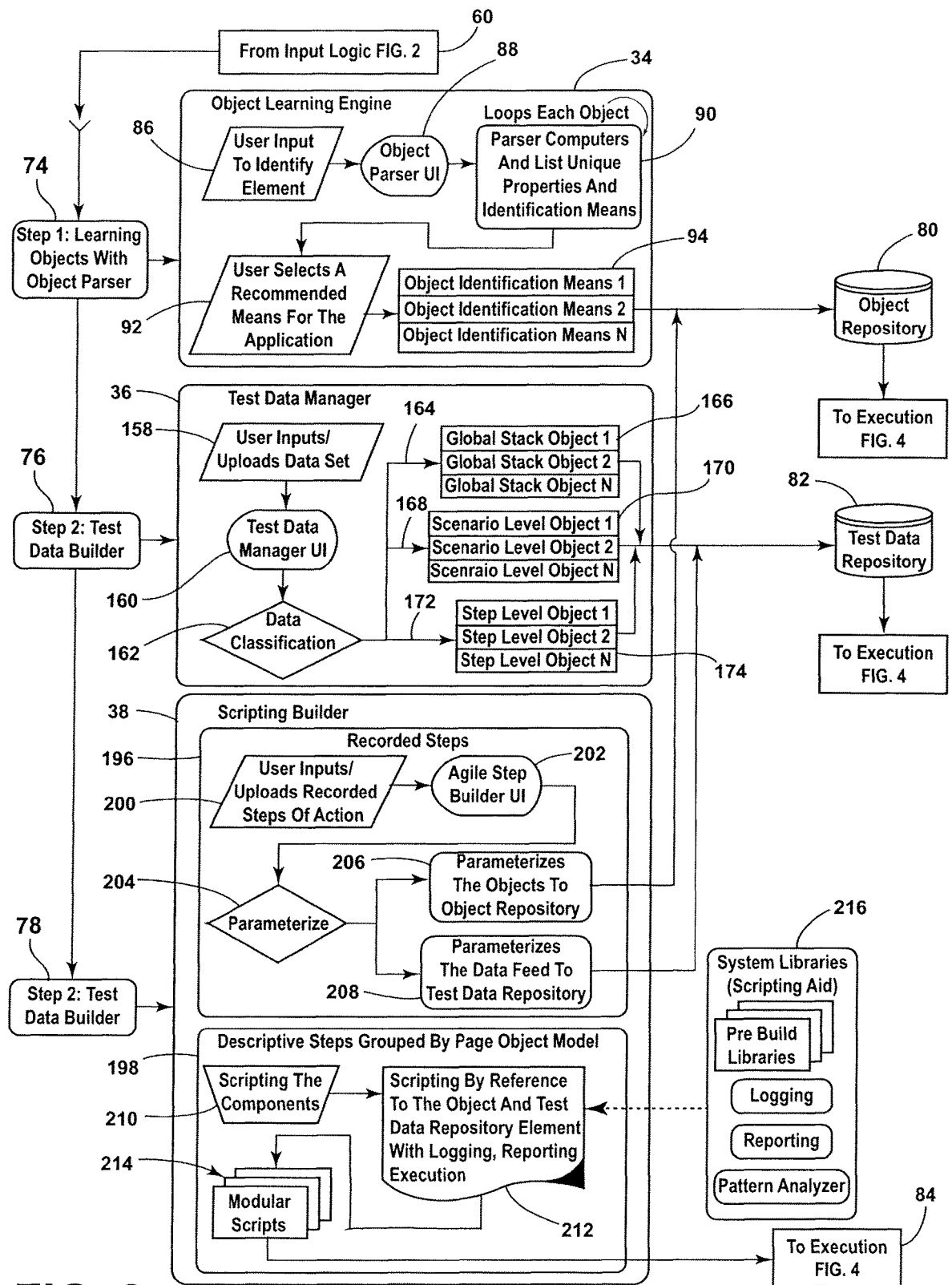
FIG. 3 is a flowchart diagram showing operation of a test scenario design aspect of the hybrid testing automation engine of FIG. 1.

FIG. 3 is a simplified flow diagram showing operation of the test scenario design mode of operation of testing automation framework logic 32, which shows a first step 74 involving learning objects with an object parser, a second step 76 involving execution of a test data builder, and a third step 78 which involving execution of a script builder. As a result of the first step 74, the object repository 80 will be populated with object data in accordance with an auto-learning feature of the instant teachings. As a result of the second step 76, the test data repository 82 will be populated with test data in accordance with a hierarchal relationship at three levels from highest to lowest, namely, a global level, a scenario level, and a step level. As a result of the third step 78, a repository of scripts (block 84) will be available for use in the test automation phase and which can be characterized as being modular scripts according to a further feature of the instant teachings.

With continued reference to FIG. 3, the first step 74 involves object learning through operation of the above-mentioned object learning and repository module 34. In an embodiment, module 34 includes a feature of object learning by specialized spying engine. In particular, in order to bring in efficiency in learning the object properties the very first time, rather than employing a conventional static spy option, the system 20 via module 34 is configured to parse different possibilities in order to facilitate the user (e.g., the automation engineer) to opt for any distinct combination. Additionally, in regard to a web page, for example, that includes dynamic objects—a not unusual situation since on average 20-30% of objects in a page are not static and unique by its properties and on top of that the typical user (automation engineer) lacks the expertise of XPath, may end up writing an iterator to scan through multiple objects in order to derive the anticipated object. In other words, a user interprets fields like checkbox, radio button and other controls often referred by a contextual label like a "book now" button/link corresponding to a flight details in a tabular data. This challenge is mitigated though the spy engine according to the instant teachings, which will help the user to derive the destination object based on some reference object with single click (in an embodiment).

In FIG. 3, in block 86, module 34 is configured to obtain user input to identify the element. Next, the module 34 is configured to execute an object parser (including object parser user interface UI). Next, the module 34 is configured to loop through each object and for each object, the parser computes and lists the respective unique properties and respective identification means. Next, the module 34 in block 92, allows the user to select a recommended identification means for the application (under test). The object may have a plurality of different identification means, as shown in block 94 as Object Identification means 1, Object Identification means 2, Object Identification means n where n designates the maximum number of different identification means. However, by virtue of the user selection in block 92, one of the plurality of Identification means shown in block 94 will be set as the recommended. However, having a plurality of identification means reduces the chances of a failure due to identification failure. The results of the object learning step 74 are stored in the object repository 80.

Figure 5:
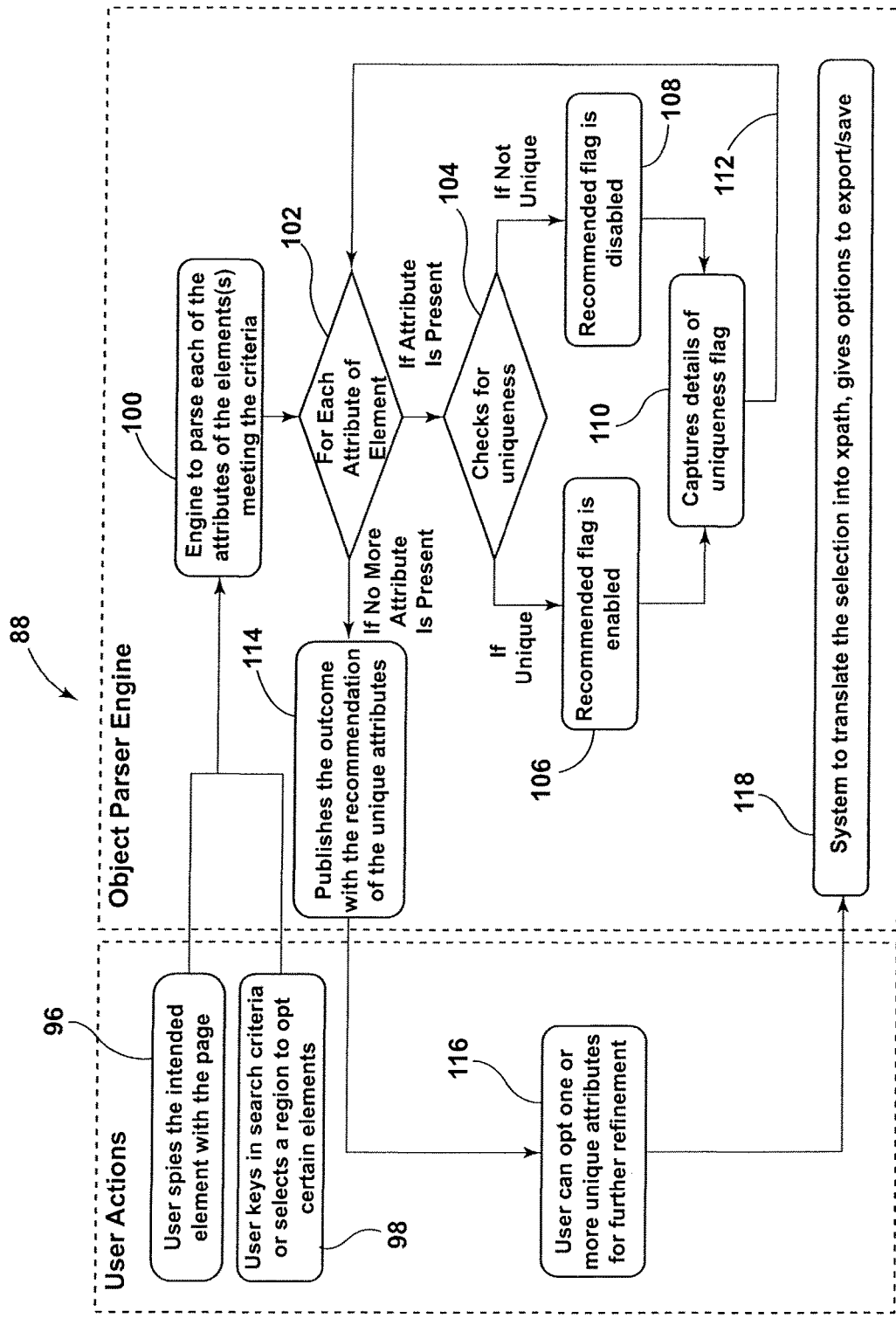
FIG. 5 is simplified block and flowchart diagram showing operation of an object learning and repository module of FIG. 1, in an embodiment.

FIG. 5 shows the operation of the object learning module 34 in greater detail, in an embodiment. Preliminarily, it should be appreciated that a web page may include a plurality of elements. Each element may include, for example only, a start tag, an end tag, and content such as an element value inserted between the start tag and end tag. The content of the element can be additional elements. An element can have one or more attribute(s) associated therewith that provides additional information about the element, and may be specified in the start tag of the element. The attribute (or each attribute if there is more than one attribute) may have an attribute value (or respective value as the case may be). As shown in FIG. 5, the object learning module 34 is configured to accept user input as either a spy designation of the intended element with the page, as at 96, and/or obtaining search criteria (key/keyword) or a user-selected region to opt certain elements. The operation proceed to block 100.

The object parser engine (via execution of module 34) is configured to parse each of the attributes of the element(s) that meet the user selection criteria specified in blocks 96, 98. In an embodiment, an element associated with a required user action may be a predetermined element type where a plurality of identification means are determined. For example, a user giving an input to the parser to determine one or more elements matching the criterion including the element name, type and any other attribute of the target or relative elements. Operation proceeds to block 102.

Block 102 executes for attribute of the element associated with this pass of the loop (i.e., for plural elements to be parsed as in step 100). For each attribute of the element being parsed, the object parser engine checks for uniqueness (at block 104), and if the attribute is unique, a recommended flag is enabled (at block 106) or else if the attribute is not unique, then the recommended flag is disabled (at block 108). Either way, the state of the uniqueness flag is captures (at block 110), and operation is looped back to block 102 to process any additional attributes of the currently-processed element. In regard to uniqueness, the system is defined to cross validate each and every occurrence of an attribute value of the target element against every elements attribute to flag for uniqueness. The steps at reflected in blocks 102, 104, 106 or 108, and 110 are repeated as logic dictates for each element meeting the user-specified criteria. When all elements meeting the user-specified criteria have been processed (including each attribute for each of such elements), then operation passes to block 114. In block 114, the object parser engine (via operation of module 34) publishes the outcome of the above-described processing, with recommendation of the unique attributes. The operation thereafter passes to block 116, where the module is configured to allow the user to opt or otherwise select one or more unique attributes for further refinement. In block 118, the system 20

(described below) is configured to translate the user selections into XPath and gives the user the option to export/save.

Object Repository Enabled with Auto Learning.

In generally, a part of the object repository feature of the instant disclosure is to extract the identification means and store the same to the object repository and more particularly to enable multiple identification(s) to be associated for a given object. The feature of multiple identification(s) for a given object provides an increased and relatively high degree of success (i.e., high pass rate during testing) by virtue of reducing the probability of the occurrence of failure(s). This feature also analyzes the patterns to re-rank the identification mean(s) with the subject object. This increases the proficiency in reaching the object during testing with more consistency as compared to systems without the feature, which are more error prone in light of the more limited mechanisms to reach the object. And while re-ranking the object properties, the feature, the instant disclosure teaches that the object repository can be updated with corrective/updated values associated with the identification means (i.e., uncorrected/non-updated values of which may lead to failure). In other words, by associating multiple identification parameters in the system (very first time)—and in the subsequent runs in the event of any parameter failing due to application changes, would be recalibrated to update previous value with the current value existing with the application and this would be re-ranked for consistency.

With this auto-learning feature in place, the above-mentioned 30-50% of the object changes that can generally be expected with the incremental development approach (i.e., agile model) is likely to be reduced significantly, for example only, to perhaps 10%. The foregoing leads to high return for automation as compared to traditional test automation approaches. And the same time, in the event of no success with any of the identification means associated to an object, the failure to identify an identification means will be flagged so as to allow user intervention (e.g., an automation engineer) for undertaking necessary relearning.

Figure 6:
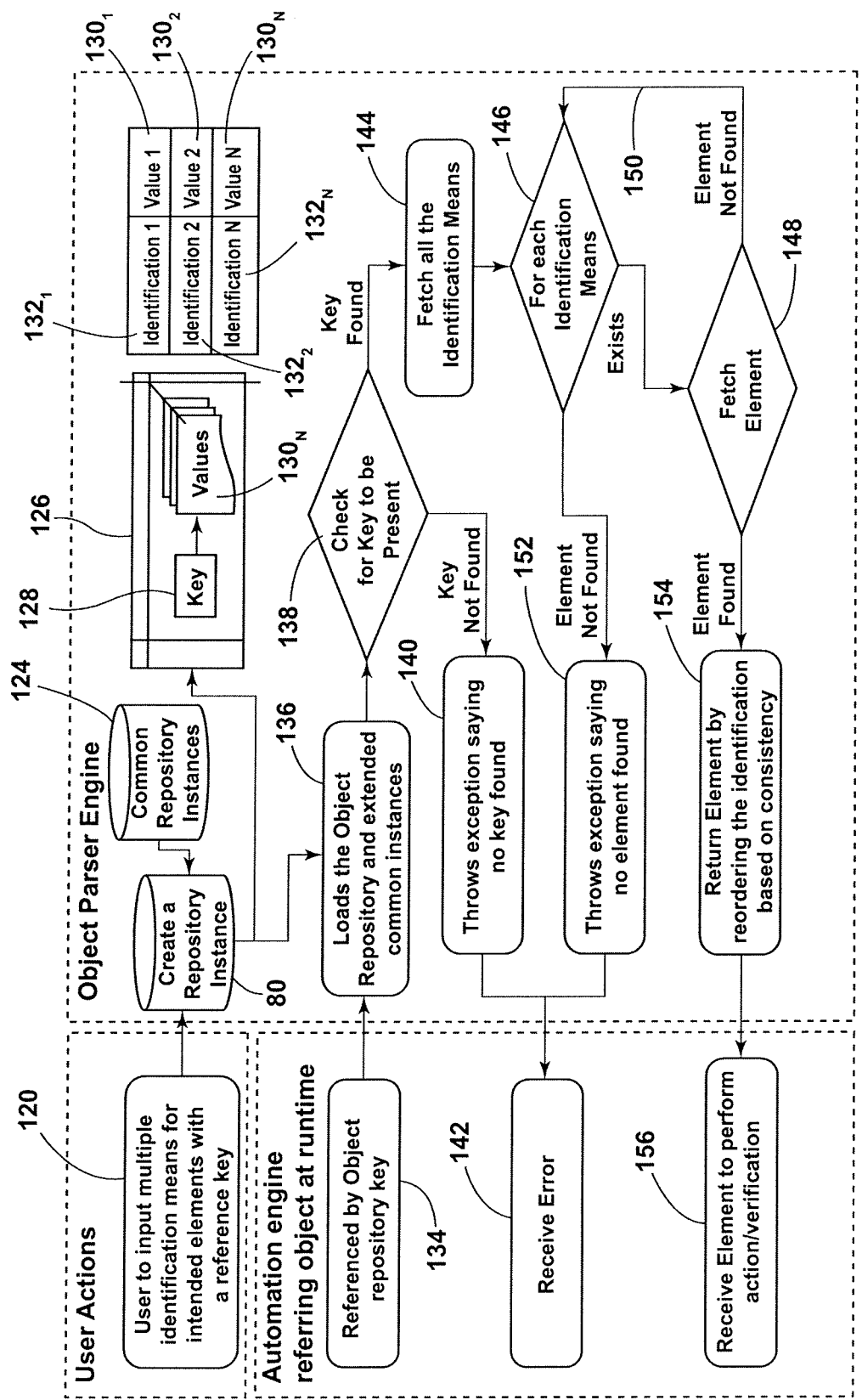
FIG. 6 is a simplified block and flowchart diagram showing operation of the object learning and repository module of FIG. 1 with object auto-learning enabled, in an embodiment.

FIG. 6 is a simplified flow chart illustrating an object repository enabled with an auto-learning feature according to the instant disclosure. The process begins in step 120.

In block 120, the system is configured to allow the user to input multiple identification means for intended elements with a reference key 128. As shown, this information is stored in the object repository 80. Common repository instances 124 feed into the object repository 80. In this regard, common repository instance is a superset of reusable elements not limited to a given page—to eliminate the redundancy of the information to ease the maintenance of the elements/object definition in the longer run. As further shown, the user input information 126 does include the key 128 which is associated with a plurality of values $130_1, 130_2, \ldots, 130_n$ for the corresponding plurality of identification means $132_1, 132_2, \ldots, 132_n$. The key 128 is mechanism through which the multiple identification means $132_1, 132_2, \ldots, 132_n$ for the subject object can be later retrieved during run time of the test automation. During the runtime execution of the test automation, the automation engine will refer to a given object. The automation engine will reference the subject object, which is shown as block 134, by using the above-mentioned repository key 128.

In block 136, the object repository engine will load the object repository and extended common instances. In decision block 138, the object repository engine will check to determine whether or not the key 128 is present. If the answer in block 138 is NO (i.e., the sought-after key 128 is not found), then the flow proceeds to block 140, where the object repository engine is configured to throw an exception indicating that the sought-after key 128 was not found. In block 142, the automation engine receives an error due to the failure to locate the sought-after key 128.

However, if the answer in block 138 is YES (i.e., the sought-after key 128 is found) then the process flows to block 144 wherein the object repository engine is configured to retrieve all the predefined identification means $132_1, 132_2, \ldots, 132_n$ for the given referenced object. The process proceeds to block 146, which begins a loop.

In block 146, for each defined identification means $132_1, 132_2, \ldots, 132_n$ the object repository engine uses the respective one of the identification means $132_1, 132_2, \ldots, 132_n$ to fetch the respective element. If the element is not found in fetch block 148, then the process loops back via path 150 to block 146 where the next identification means is processed. This process will continue until either the element is found or until all of the identification means $132_1, 132_2, \ldots, 132_n$ have been processed but no element was found. In the latter case, if all of the defined identification means $132_1, 132_2, \ldots, 132_n$ have been processed/considered without finding the element, then the process will move to block 152—throwing an exception saying that no element was found. Again, the exception 152 will result in an error 142 being received by the automation engine. On the other hand, if a particular one of the plurality of identification means $132_1, 132_2, \ldots, 132_n$ results in the element being found, then the element is returned and the plurality of identification means $132_1, 132_2, \ldots, 132_n$ are re-ordered based on consistency (e.g., the successful identification means may be reordered to be the first identification means listed in the plurality of identification means). In other words, a successful identification means will move in the listing while an inconsistent/failure with a particular identification means will move down in the listing so that reaching the intended element will be achieved in a more consistent basis. The process proceeds to block 156 where the test automation engine received the fetched element and performs the desired action/verification.

Returning to FIG. 3, the second step 76 involves establishing test data through operation of the above-mentioned test data manager module 36. In an embodiment, input data used in conducting testing is maintained having three level of abstraction, such as Global, Scenario and Step level. This hierarchy helps eliminate redundancy of data in memory and also eases burden of user with data consumption/exchange, with much of insight of memory management. Data can be classified into three categories for example data classified as global data will be made available across all the tests and among all the test steps without any redundancy leading to effective memory utilization, scenario specific data is specific to the test loaded in the very beginning of each test and can be reused across all the test steps. Step level data is specific to the test step loaded at the beginning step and would be released from memory once step is completed. It should be understood that the driving engine (automation engine) may have the capability of executing test cases in parallel and in such a situation, still the input test data pertaining to one test scenario are not overridden by another test scenario. Also, at the same time, if data pertaining to the specified key exists with all of the three levels, the user (automation engineer) can still define the order of precedence in which the data needs to be read and on demand by specify the context any information from given layers can be read. The test data manager module is also configured with flexibility (i.e., with no restrictions) so as to enable the user to load these desired data for any one of a number of external sources like database(s), web services, flat files, and the like.

In the illustrated embodiment of FIG. 3, the test data manager module 36 is configured to provide an input mechanism (block 158) to allow the user to input and/or upload one or more data sets for subsequent storage in the test data repository 82.

In block 160, the test data manager module 36 is configured to provide a user interface to allow the user to classify data in one of the three hierarchical levels mentioned above, namely, the global level, the scenario level, and the step level. Block 162 represents a selection by the user of which level the subject input test data should be associated with.

If the selected level for the subject input test data is the global level (path 164), then the test data manager module 36 will make that association as shown at 166 (e.g., Global Stack Object 1, Global Stack Object 2, . . . , Global Stack Object n). This test data is then stored in the test data repository 82.

If the selected level for the subject input test data is the scenario level (path 168), then the test data manager module 36 will make that association as shown at 170 (e.g., Scenario Level Object 1, Scenario Level Object 2, . . . , Scenario Level Object n). This test data is then stored in the test data repository 82.

If the selected level for the subject input test data is the step level (path 172), then the test data manager module 36 will make that association as shown at 174 (e.g., Step Level Object 1, Step Level Object 2, . . . , Step Level Object n). This test data is then stored in the test data repository 82.

Figure 7:
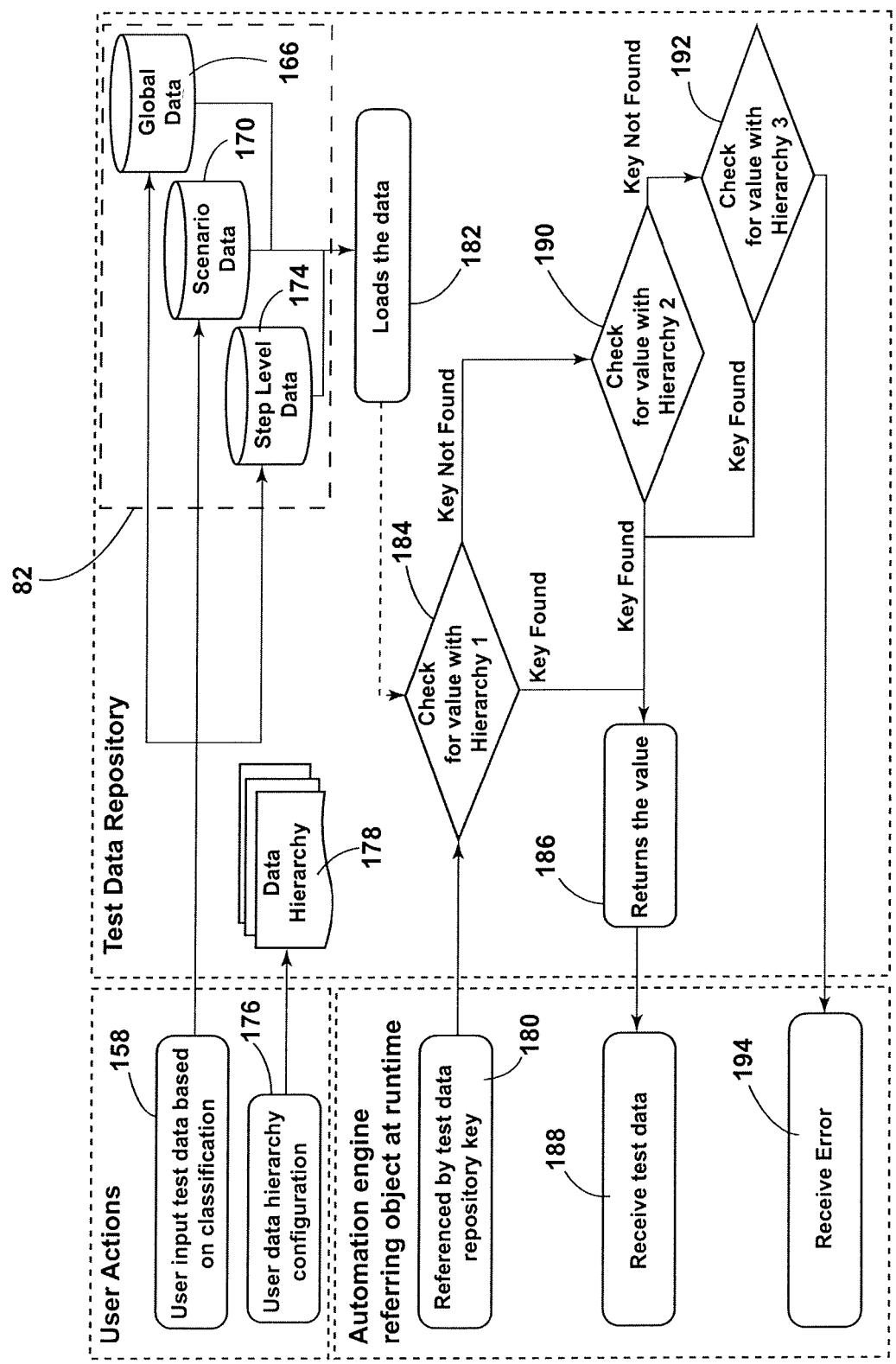
FIG. 7 is a simplified block and flowchart diagram showing operation of the test data manager module of FIG. 1, in an embodiment.

FIG. 7 shows, in greater detail, operation of the test data manager module 36, in an embodiment. Block 158 may be the same or similar as that in FIG. 3, where the module 36 is configured to input test data and specify desired classifications, i.e., Global level, scenario level, and step level. The input test data is saved to the test data repository 82, which may be segregated (e.g., logic or otherwise) into global level data portion 166, scenario level data portion 170, and step level data portion 174 (see also FIG. 3).

In addition, the test data manager module 36 may be configured to allow the user to configure data hierarchy, which configuration is saved to a data hierarchy storage 178. In case of a data field with a given label available with various data hierarchy, like UserName is a data field available with the Global level as well as the Scenario level, the system would consider the value from the data hierarchy configuration parameter to known which one to be considered with or has having precedence.

During the runtime execution of the test automation, the automation engine referring object will seek to retrieve corresponding values for test data, which in an embodiment, begin in block 180 which is referenced by a test data repository key (value). In similar lines of the object repository where a key is used to derive the properties of the element where an action to be performed and in the case of the test data repository—the key refers to the value to be produced in a text box or a value to be verified within the page, etc.

The data repository engine, in block 182, will load the test data, including the associated hierarchical classifications mentioned above. In block 184, the data repository engine will check the loaded test data repository for the key value specified above (from block 180) that is associated with the first level hierarchy (e.g., Hierarchy 1 such as Global level). If the key value with Hierarchy 1 is found, the test data repository engine will return the value (at block 186) wherein the automation engine is configured to receive the desired test data (at block 188).

On the other hand, if the key (value) is not found with the first level hierarchy classification, then the test data repository engine will check the second level hierarchy (block 190) for the key (value) and if still not found, will check the third level hierarchy (block 192) for the key (value). If the scan for the key (value) through all the three levels of the data hierarchy results in no key being found, then this outcome is passed to block 194, wherein the automation engine receives the no key found error from the test data repository.

Returning to FIG. 3, the third step 78 involves generating test scripts through operation of the above-mentioned scripting module and driving engine module 38. It should be understood that a framework according to the instant disclosure is enabled to have both scripted and script-less components. The module 38 provides a rich user interface (UI) that includes features such as the ability to facilitate the sequence of the component and to define contextual component test data allows users at many different skill levels to participate in the automation setup. The script less component eases recording unlike record and playback frameworks which can leads to hard coded test data and object details. The recorded statements, the object, and the test data values are externalized with a one click solution, in an embodiment, in order to bring in a high degree of reusability.

As to the scripted components, the module 38 gives the user (e.g., automation engineer) a free hand to define the actions and associate to the object repository and to the test data. The module 38 also facilitates the automation of possible input types pertaining to keyboard and mouse with certain perform libraries. Similarly, the module 38 also facilitates rich libraries for verification and inserting desired waits (time periods). Especially waits are more fluent in nature rather static sleep with max elapse time as an argument and with an expected behavior. Numerous built-in libraries (e.g., over 150 in an embodiment) can provide qualitative outcome with logging, reporting and exception handling, which is likely to give 50-60% productivity over other frameworks. In addition to the pre-built libraries, there are provisions to bring in best of inheritance and polymorphism of Java to create project specific asserts to load and consume on demand. In an embodiment, the built in libraries may be custom/wrapper classes built to enhance the publicly available tools with soft integrations.

The test designer aspect enables a rich user interface, which lists the script less and scripted component created by the automation engine. And using which non-technical functional engineers will be able to sequence the components with appropriate test data, thus eliminating the dependencies among the functional and automation engineer, which helps to further increase productivity. This agility also allows for the design and test even run time without any scripting, providing opportunity for ad hoc testing and unit testing.

Scripting module 38 includes a recorded steps module 196 and a modular script generator module 198 configured to generate modular scrips corresponding to the descriptive steps grouped by the page object model. At block 204, the module is configured to facilitate the user to parameterize objects and test data. Block 206 involves parameterizing the Objects to the object repository 80 for later retrieval during test automation. Block 208 involves parameterizing the test data feed to the test data repository 82 for later retrieval during test automation.

The recorded steps module 196 is configured to record steps of user inputs and/or actions for later playback during test automation. The module 196 is configured to provide a facility or mechanism (at block 200) for the user to input and/or upload records steps of action (e.g., clicks, keystrokes, data entry, etc.). The module 196 also provides an agile step builder user interface (UI) at block 202.

Modular script generating module 198 is configured to automatically generate modular scripts (e.g., reflecting a target page) for use in test automation. This module eliminates the need to create scripting manually by analyzing the preexisting recorded steps or non-descriptive actions designed in the systems, giving the ability to move from non-descriptive to descriptive with a click of button. Block 212 involves scripting by reference to the object and test data repository elements with logging, reporting, and exception handling. Block 214 involves generating the modular scripts, which will be described in greater detail below. FIG. 3 also shows block 216 comprising a plurality of built-in libraries for use in a plurality of useful support functions such as logging, reporting, pattern analysis, etc.

In general, the blocks of FIG. 3 involve test scenario design, an example of which will be set forth in connection with FIGS. 8-11.

Figure 8:
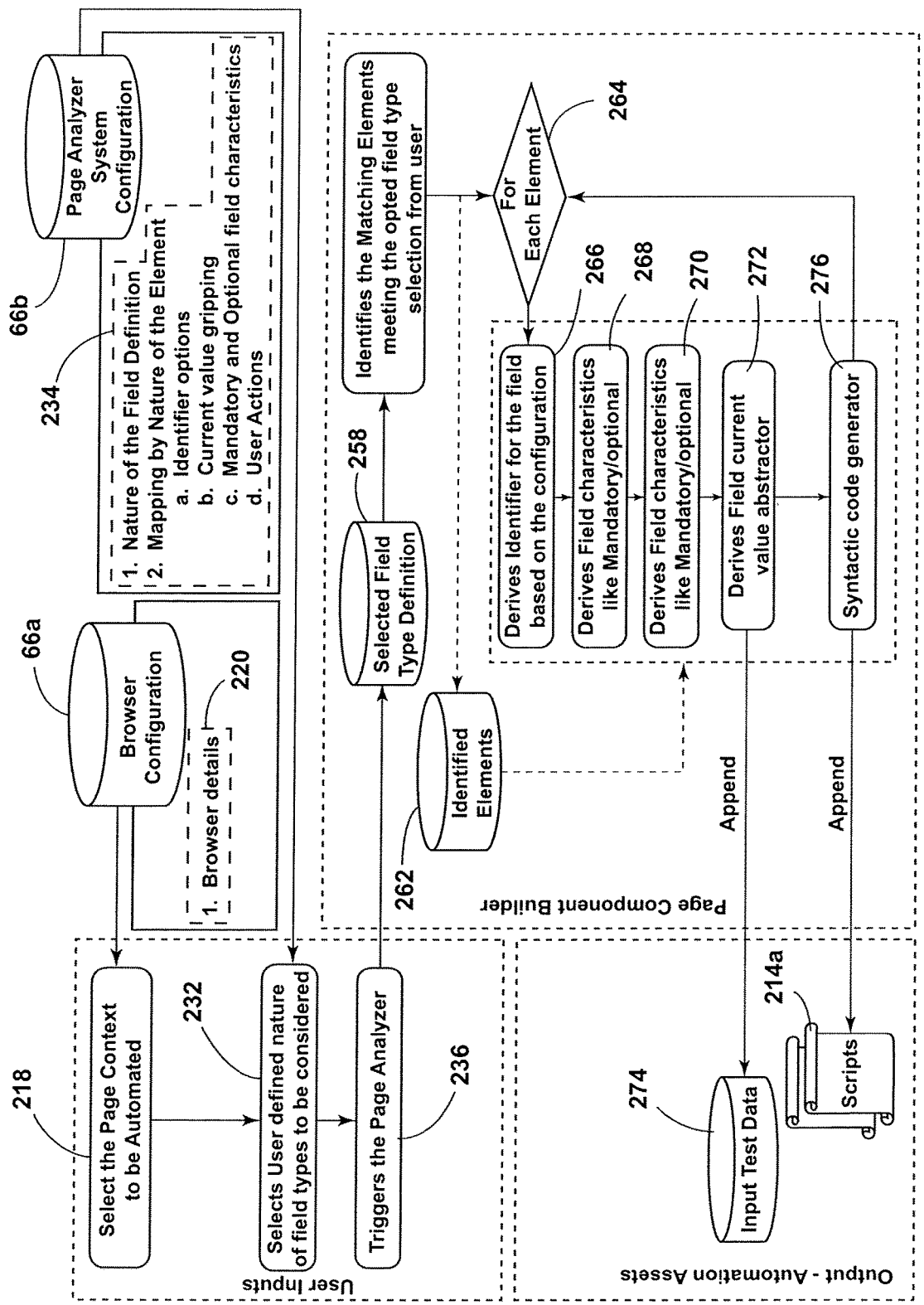
FIG. 8 is a simplified block and flowchart diagram showing operation of a page component builder portion of the scripting module and driving engine module of FIG. 1, in an embodiment.

FIG. 8 is a simplified flowchart and block diagram view of a page component builder. In block 218, the user makes a number of selections. Generally, one item for the user (e.g., automation engineer) to select involves the target test environment as well as the test application screen targeted for automation. For example, the user may select the test environment particulars including a target operating system/platform (e.g., Windows, Mac OS X, Android, etc.) as well as the browser type. For example, the FIG. 8 shows a browser details configuration setting 220 stored in the configuration settings 66a. The user may also select a mode of navigation to be used in the testing automation framework. In this regard, the testing automation framework logic 32 includes input logic configured to allow the user to make one or more of the above selections, as well as to allow the user to select a navigation mode from (i) an assisted automation mode; (ii) a semi-automation mode; and (iii) a manual traversal mode.

Step 218 includes selecting the page context to be automated. This can be navigated by the user (automation engineer) from a signin page (FIGS. 9A-9B generally) of the application under test. From step 218, the method proceeds to step 232 where the user selects user-defined nature of field types to be considered. A page analyzer system configuration 66b may include at least the following: (1) Nature of the Field Definition; and (2) Mapping by Nature of the Element including (a) identifier options; (b) current value gripping; (c) mandatory and optional field characteristics; and (d) user actions. The method proceeds to step 236 where the user commands the page analyzer into operation.

The core engine, namely the test execution module 39, for driving the automation may be operated in an assisted automation mode with the user initiating a page component builder and automated script generation with no recorder or manual intervention by the user or alternatively levels of manual involvement can be opted for by the user. FIG. 8 shows in steps 258-272 the latter approach that involves a certain level of manual intervention in terms of the field type being selected and will be described below. FIGS. 9-10 on the other hand shows the former approach and shows a more automated approach.

Returning to FIG. 8, in step 258, the module 198 (see also FIG. 3) operates to scan the code describing the test application pages and, based on the selected field type definition 258, identifies (step 260) all the elements that meet the opted field type selection from the user (i.e., the designated identified elements 262). Thereafter, the module 198 loops (at block 264) for each element in the set of identified elements 262 and performs the following: (i) derives an identifier for the field based on the configuration (block 266); (ii) derives field characteristics like mandatory/optional (block 268); (iii) derives field characteristics like mandatory/option (block 270); and (iv) derives field current value abstractor (block 272). As per the test application behavior, a few fields might be required to be populated to proceed further, which is mandatory, is analyzed by the page analyzer and in similar lines if it is not mandatory, it would be factored as options which eases the user while populating the test data to drive the execution smoothly. The information from blocks 266-272 are appended to the element and stored in the input test data 274, which may be part of the test data repository 82. The loop described above is performed for each of the identified elements 262 and the results are saved in test data 274.

In block 276, the module 198 (see also FIG. 3) generates code using a syntactic code generator 276, which is stored in scripts 214a, which may be a part of scripts 214 (see also FIG. 3). In an embodiment, this generator may be custom configured to build to mapping to existing prebuilt libraries and can be updated to custom libraries as part of any custom project.

Figure 9A:
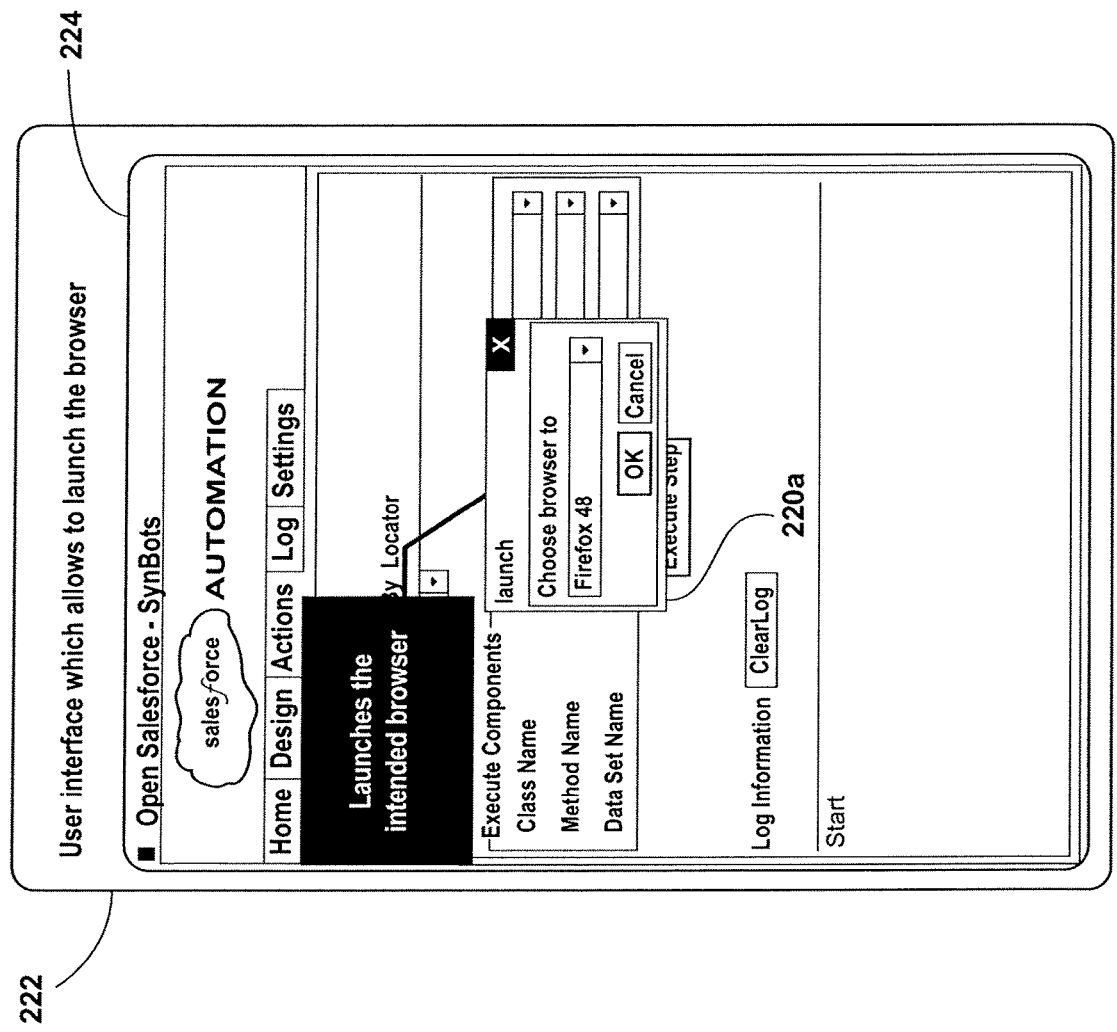
FIGS. 9A-9B is a simplified screen display showing an assisted automation feature of the page component builder portion of FIG. 8, to facilitate a login to a target application, in an embodiment.
Figure 9B:
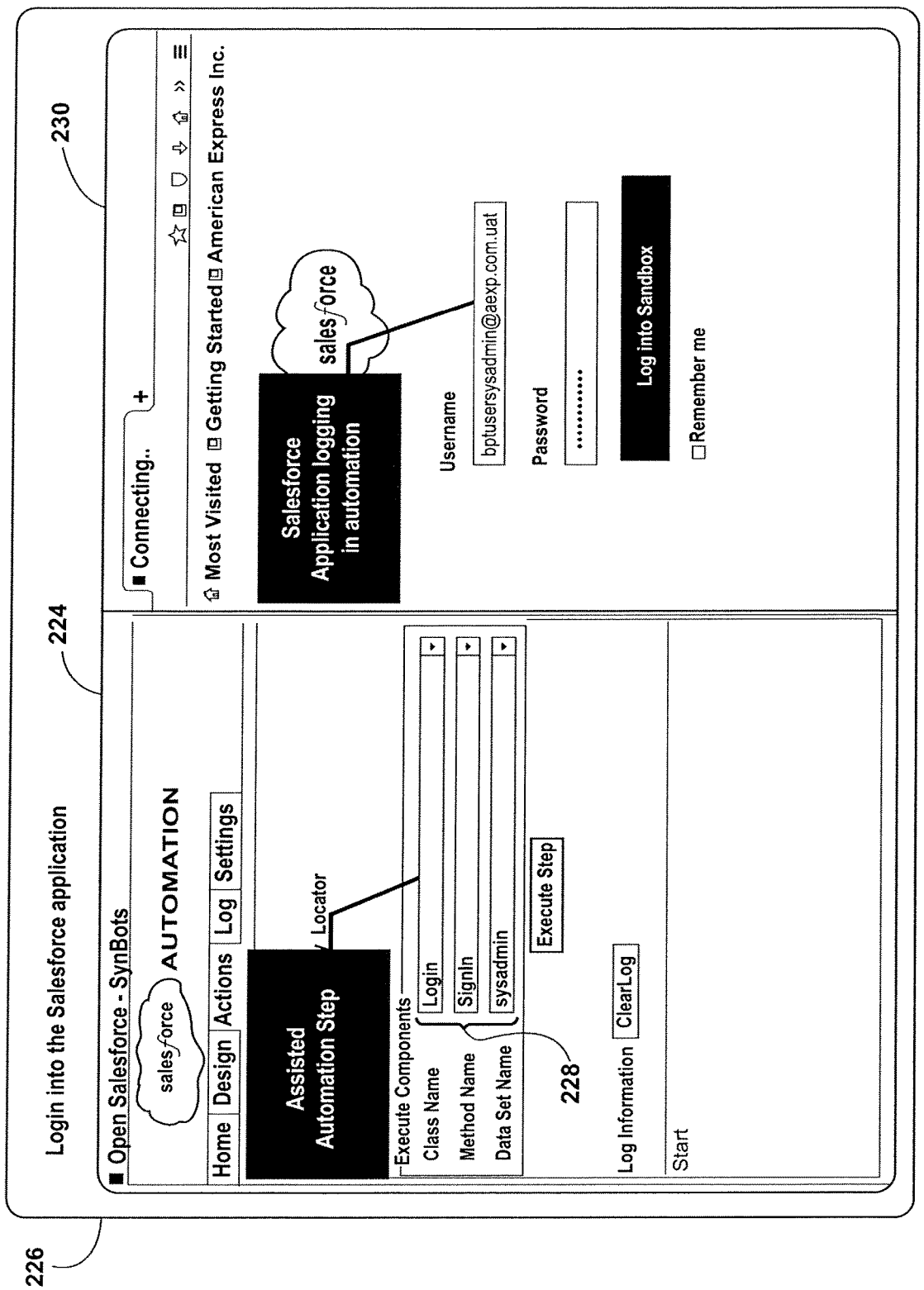

FIG. 9A shows a screen display 222 including a web page screen display 224 produced by the input logic of the testing automation framework logic 32. For example, the input logic is configured to allow the user to select the target browser via input screen 220a, which is saved in browser configuration 220 (FIG. 8). FIG. 9B further shows a screen display 226 that includes screen 224 that includes drop-down selections 228 collectively configuring the navigation mode to operate in the assisted automation mode described above (i.e., login/signin). FIG. 9B further shows the automation automatically, based on the selections via drop-downs 228, logging into the target application under test (screen 230).

FIG. 10A is a screen display 238 that represents the target page of the application under test that is to be automated, which is specifically designated as web page 242. The user (i.e., the automation engineer) may navigate to this page 242 from the signin page (FIG. 9B). As shown, the page 242 includes a plurality of different fields (i.e., html elements), for example only, a text input box 244 called "Opportunity Name".

Figure 10B:
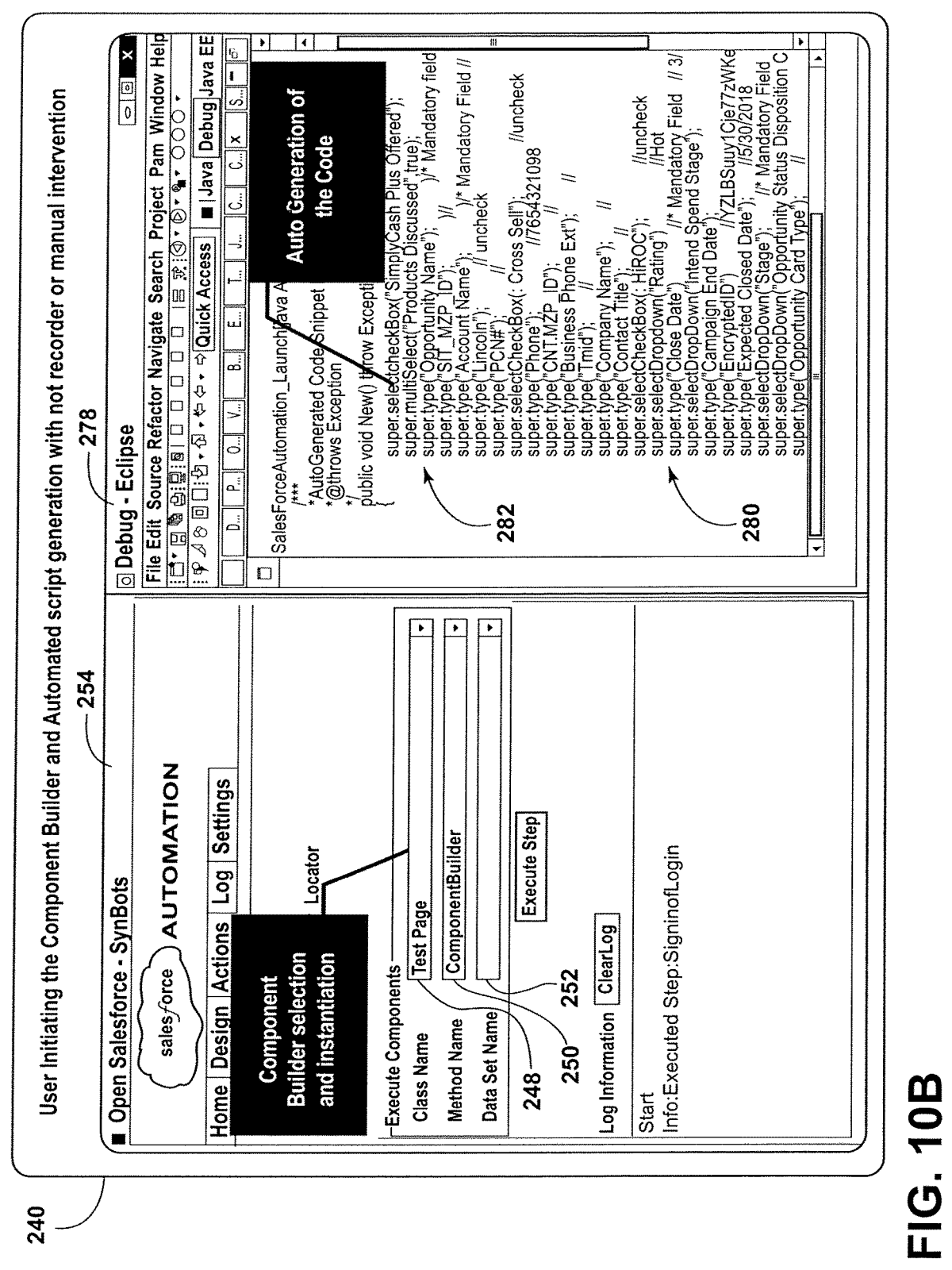

FIG. 10B also shows a screen display 240 which represents the user interface provided by the testing automation framework logic 32 and with which the user (i.e., automation engineer) interacts. In particular, the screen display 240 includes a first page 254 and a second page 278. The first page 254 includes an interface including a plurality of user selections through which the user can initiate an automatic page component builder. For example only, the first page 254 includes a region thereof called "execute components" that include plural drop-down menu selections where the user can select a Class Name 248 ("TestPage" selected as shown), a Method Name 250 ("ComponentBuilder" selected as shown), and a Data Set Name 252. As shown on first page 254, the user has made selections to initiate the page component builder and invoke the automated script generator without the recorder or manual intervention.

The second page 278 shows the output of the automated script generator, which output includes code 280 corresponding to the content/fields/elements found on the target page 242. For example only, code 280 includes a line (below) that corresponds to field 244 called "Opportunity Name" on the target page 242.

Super.type("Opportunity Name"); //* Mandatory field // Test

The automated script generator is configured to produce code that will be executed by when the test automation executes. In an embodiment, the automated script generator is configured to manage fields like a test input field, a check box, a select dropdown, a multi select. Along with the code creation, the automated script generator also lists the default values with the respective fields. Table 1 (below) shows an example of a code snippet of the code 280 generated by the automated script generator.

TABLE 1

Code Snippet

```
super.type("PCN #");//
super.selectCheckBox("Cross Sell ");//uncheck
super.type("Phone");//7654321098
super.type("CNT_MZP_ID");//
super.type("Business Phone Ext");//
super.selectDropdown("Stage");//* Mandatory Field  // Contact
super.type("Tmid");//
super.type("Company Name");//
super.type("Contact Title");//
super.selectCheckBox("HiROC");//uncheck
super.selectDropdown("Rating");//Hot
super.multiSelect("Reason",true);
super.selectDropdown("Lead Source");            //--None--
```

Figure 11:
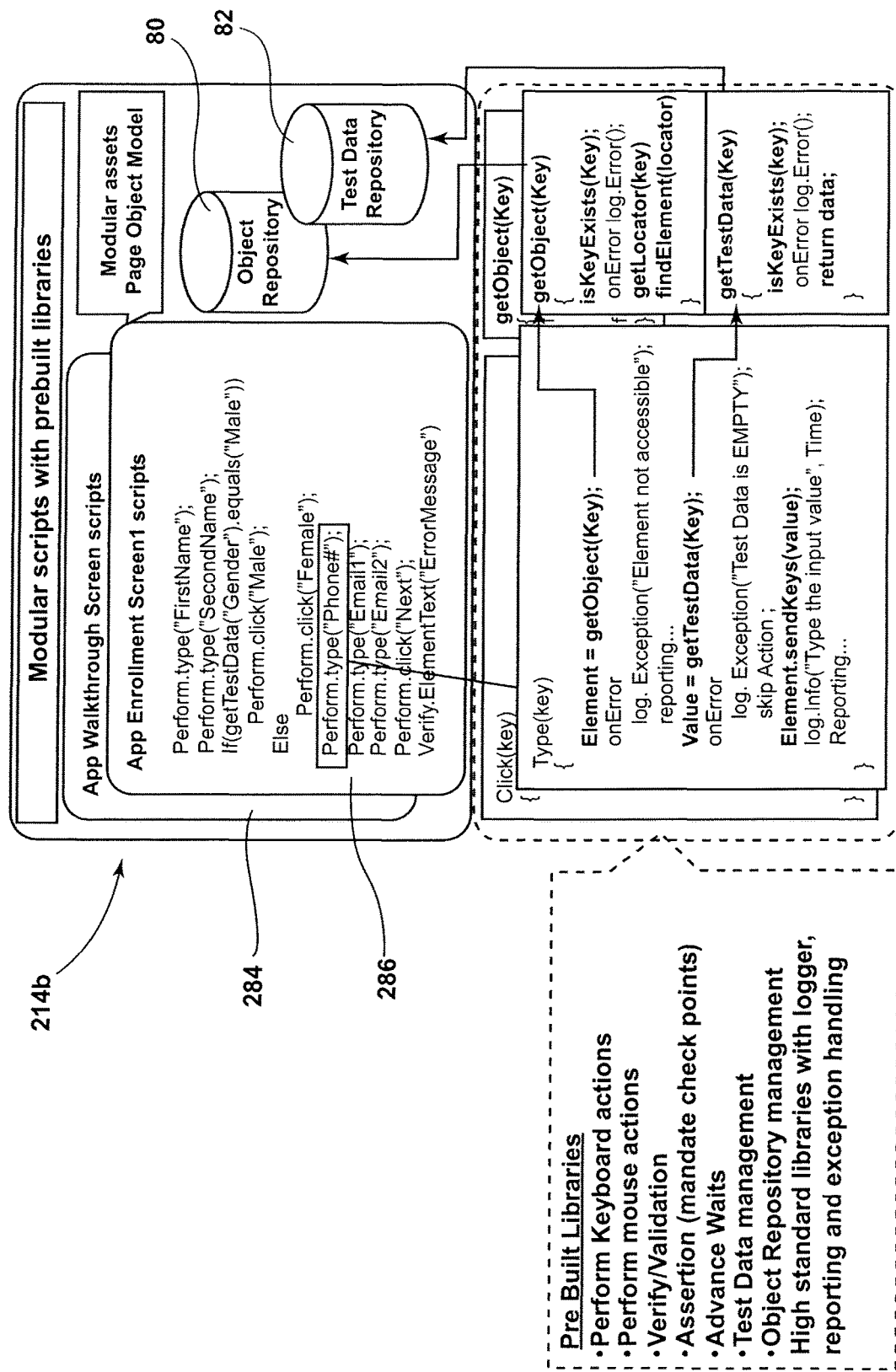
FIG. 11 is a diagrammatic view of modular scripts produced by the scripting module of FIG. 1, in an embodiment.

FIG. 11 is a simplified diagram showing modular scripts 214a. The scripts generated by the system 32 are organized, for example, by screen, as opposed to traditional script generators that simply produce a series of code statements at the code line level. In FIG. 11, the code associated with a Walkthrough screen is designated 284 while the code associated with the an Enrollment screen, designated 286, is separated as a different unit.

Execution of Test Automation.

Figure 4A:
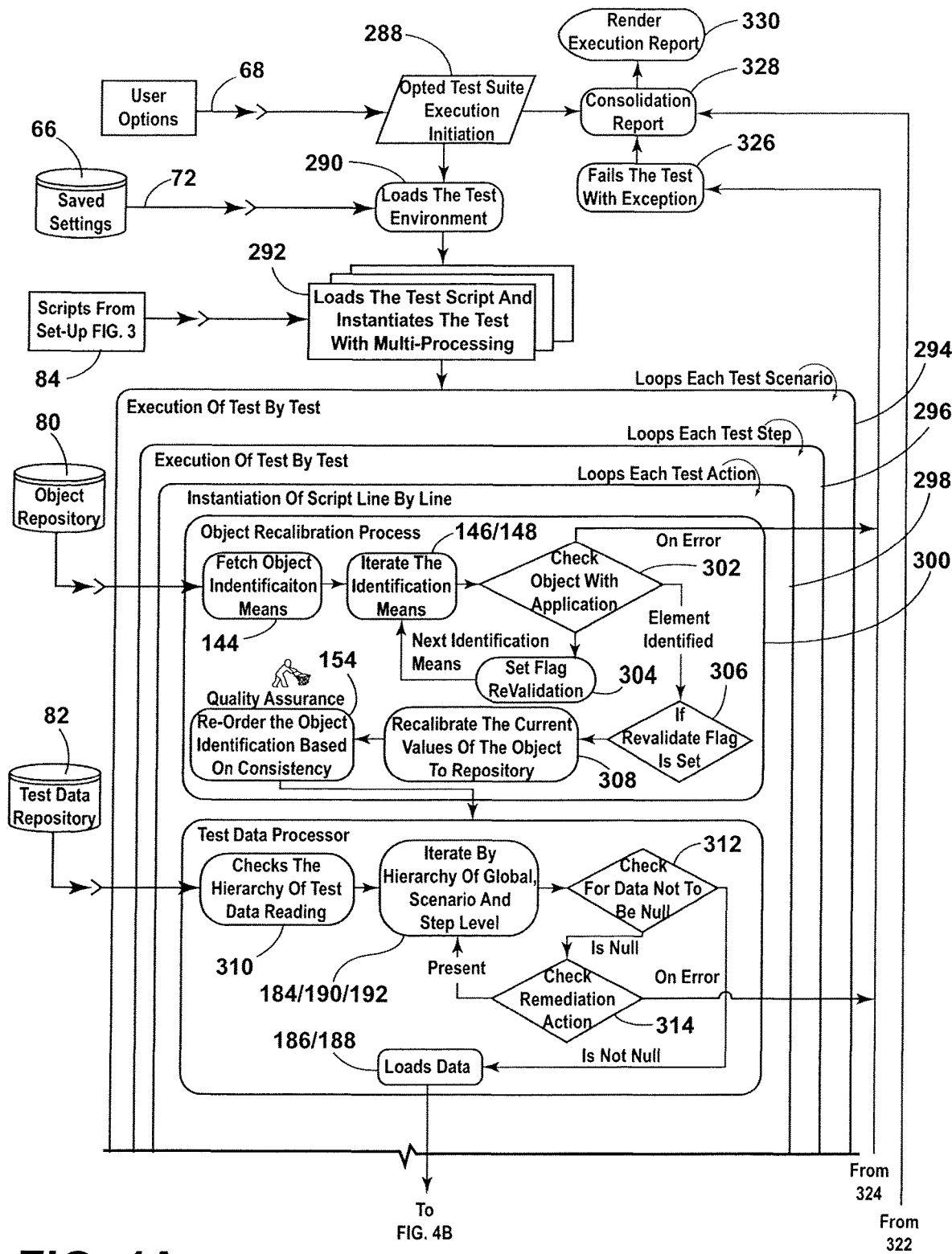
FIGS. 4A-4B are flowchart diagrams showing operation of the test execution module shown in block form in FIG. 1, in an embodiment.
Figure 4B:
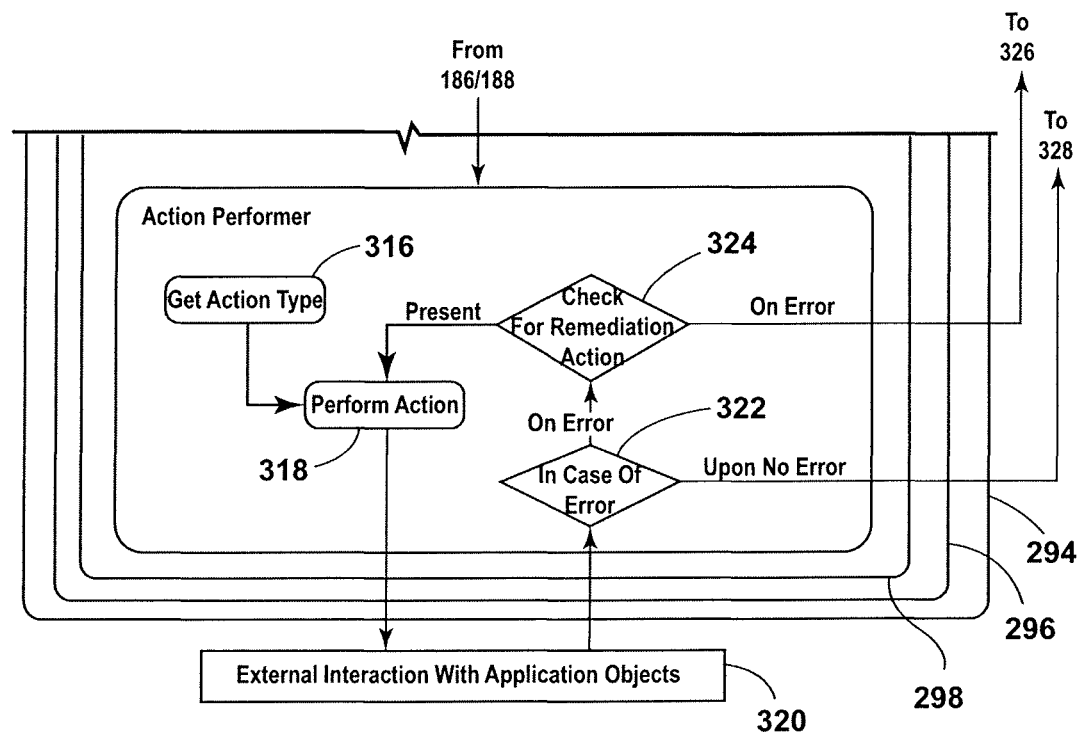

FIGS. 4A-4B is a simplified flowchart showing execution of an automated software test in accordance with the teachings of the instant disclosure. The flowchart showing the execution of an automated software test begins in step 288, where the user opts or otherwise selects (e.g., via input logic 33—FIG. 1) the test suite execution initiation, which is performed by the test execution module 39 (FIG. 1). As shown in FIGS. 4A-4B, any user-selected options pertaining to the test suit execution are available to the test execution module, which flow over path 68 into step 288. The flowchart proceeds to step 290.

In step 290, the test suit execution loads the selected test environment, which is retrieved from the saved settings storage 66 and flows to the test execution module 39 over path 72. The flowchart proceeds to step 292.

In step 292, the test execution module 39 loads the appropriate test script(s) and instantiates the execution of the test. In an embodiment, the test execution module 39 can perform this step with multi-processing. As shown in FIGS. 4A-4B, the test execution module 39 performs the actions to be described below in an iterative manner, meaning, that the test execution module 39 loops for each Test Scenario, loops for each Test Step, and loops for each Test action. The execution then begin processing of the previously-produced scripts which are instantiated line by line.

Object Recalibration Process.

In the block captioned Object Recalibration Process, the test execution module 39 is configured to fetch (at step 144) object identification means previously saved from the object repository 80. Next, the test execution module 39 iterates through the (plural) identification means (at step 146, 148). In step 302, the test execution module 39 checks the (fetched) object with the application and in the case where the element is not identified, a flag is reset (i.e., invalid—see at 304) regarding the validity of that particular identification means whereas in the case where the element is identified, then the flag is set (i.e., valid—see at 306) as meaning that the identification means was valid in the application for the subject object. If there is an error, a report of this is provided to step 326, which is configured to be the collection agent for reported errors as will be described.

If necessary, the test execution module 39 is configured to recalibrate the current values of the object and save the same to the object repository 80. The process proceeds to step 154, wherein the test execution module 39 is configured to re-order the object identification means based on consistency.

Test Data Processor.

The test execution module 39 is configured to include a test data processor that performs hierarchy check as described briefly above. In step 310, the test data processor of module 39 checks the hierarchy of the test data when reading in the test data for the testing of the subject test case. Next, the test data processor of module 39 iterates by the hierarchy described herein comprising Global level, Scenario level, and Step level (at reference numeral 184, 190, 192). The test data processor of module 39 checks to make sure that the test data is not null (at 312), and if so, checks for remediation action at 314 (if the remediation is present then the control branches back to block 184, 190, 192). If the there is no defined remediation action to address the null condition, then an error is produced and the flow proceeds to step 326.

However, if the data is not null (i.e., contains valid data), the test data is loaded (at 186, 188).

Action Performer.

The test execution module 39 also includes an action performer configured to execute the actions established by the scripts using the object(s) and test data as described herein. In step 316, the action performer gets the action type. In step 318, the action performer performs the subject action. In this regard, the action may involve external interaction with Application Objects at 320. The action performer is configured to determine the result of the interaction in 320 in decision block 322. In the case of no error detected in block 322, then the (successful) execution of the action is reported to reporting step 328, otherwise in the case where an error is detected in block 322, the action performed is configured to check for possible remediation actions in block 324. If the action performer identifies that an appropriate remediation is present for the error detected in block 322, then such remediation is taken the action performer re-tries the dictated action starting at step 318. Otherwise, if the action performed identify that no appropriate remediation is present, then the error is reported to block 326.

Error Reporting.

The successful or unsuccessful execution of the test action(s), as well as any errors reported in the object recalibration process(es) and test data hierarchy test(s) are collected at step 328 to prepare a consolidate report for the user, which report is rendered at step 330.

In sum, as set forth below, embodiments consistent with the instant disclosure address one or more of the problems described above.

Object Learning and Repository Module (Advanced Object Parser).

The object learning and repository module implements an advanced object parser, which eases the automation engineer's laborious activity of object learning through the detailing of unique identifiers for targeted elements. The advanced object parser is capable of facilitating the relative identifier based on the automation engineer's inputs and also provides the mechanism to learn multiple elements with ease of use involving both contextual search and region selection approaches. In one embodiment, the object learning module provides for the spying of an element (i.e., the spied element or target element) within a given web page wherein the object learning module is configured to read each attribute of the spied element and then validate each attribute thereof for uniqueness within the given web page. The object learning module is also configured with a GUI to denote for the user, via a flag, whether each of the attributes is unique (or not). In addition, the object learning module is configured to allow the user to pick and choose a combination of attributes to define a multi-conditioned locator, such as an XPath descriptor in order to further refine elements, considering futuristic changes that may come with such elements within the web page. In another embodiment, suitable for more traditional element by element spying and learning, the object learning module can be configured to accept input feeds from the user, for example, in terms of any keyword or exact value associated with an attribute of an element, wherein the object learning module would parse all elements meeting the user-provided criteria within the given web page and output a listing of the elements meeting the user-provided criteria and/or with their unique attributes highlighted. Alternatively, the object learning module is configured to provide a user interface that gives the user the ability to select a region of the web page specifying which elements to retrieve, including the ability to specify the preferred type of element within the selected region.

Object Learning and Repository Module (Object Repository Enabled with Auto-Learning).

Some of the most critical aspects for the test automation, especially in agile development, is addressed the recursive nature of maintenance due to the incremental development and changes in the software dictated in the agile model. The object learning and repository module implements an object repository enabled with auto-learning to address these challenges, which facilitate the determination of multiple identifiers (identification means) for the targeted elements in order to eliminate failures in identifying the elements as well as including an auto learning capability configured to remediate any object changes that occur from time to time due to the software application changes. In one embodiment, the object learning and repository module is enabled to facilitate determining multiple identification means for the target elements, for example, where an action needs to be simulated during testing. In addition, determining multiple identification simplifies the consumption of the same with the scripts by a factory design pattern to encapsulate the nested identifying means for each element. In other words, by associating multiple identification parameters in the system (very first time)—and in the subsequent runs in the event of any parameter failing due to application changes for example, would be recalibrated to update previous value with the current value existing with the application and this would be re-ranked for consistency, as already described above.

When the system (e.g., the test execution module during testing) encounters an error to get the intended element using the first identification means, rather than pushing the error to the requesting module, the system will drop down and will be validating the next (e.g., second) second identification means for the element and so on until the system is able to get the intended element, and upon success in getting the element, the automation script(s) can move on without any interruption. In the case of an error, while validating the one of the identification means, the system would analyze the consistency of the identification means in order to re-rank the listing so as to bring greater consistency and move the successful identification means to the top of the listing, to eliminate any delay in reaching the intended element that would otherwise occur using the first (error prone) identification means. The system, while re-ranking the listing, is configured to push the inconsistent identification means lower in the listing order, and as a proactive measure, the system would check for new values associated with identification means that were failing for a given element and then update the object repository from time to time.

Test Data Manager Module (Data Management).

The test data manager module allows data exchange among the various modules without any parameters which can reduce the maintenance cost in refactoring the code time to time that would otherwise be necessary due to a change in a data type or additional data values. The test data manager module implements a multi-level hierarchy that eliminates duplication/redundancy of the data by allowing data to be associated with various levels, which can be a module level (step level), a scenario level, and a global level. The existence of the data hierarchy helps to assign values and then use such at appropriate place holders and also in purging of the data based on the scope of the data management hierarchy level. In an embodiment, the test data manager module is enabled with configuration setting(s) to define the hierarchy level in or at which the data needs to be used, which organizes the test data as per the needs of the test automation and reduces and/or eliminates data duplication. With the configured setting(s) in place, when the user (e.g., the automation engineer) makes a reference to retrieve a value from the test data, the test data manager module would respect the hierarchy and look for the intended data within the respective test data repositories allowing overriding of the data in required places.

Scripting Module (Pre-Built Reusable Libraries).

The scripting module 38 includes pre-built libraries as part of a solution with multi-level abstraction of core selenium functions to ease implementation of a variety of desirable functions: (i) abstraction of many unknown run-time challenges are overcome by the use of the pre-built libraries, which incorporate a wide variety of contextual workarounds based on the nature and/or definition of the error, rather than the application just throwing an error that would have to be fixed by the user (automation engineer); (ii) providing a variety of logging, reporting, exception handling, and multi-thread safe mechanism are a few additional inherent advantages for the consumer, who need not have any explicit knowledge of such matters; (iii) inheriting the features of selenium, which gives a robust unified platform for the web and mobile solutions as is. In an embodiment, the pre-built libraries are enabled with the best of Java design practices, with the right abstraction and encapsulation in order to facilitate critical features like multi-threading and essential features like logging, reporting, and exception handling in place, which can result in a reduction in scripting effort for the user (automation engineer), for example, by a factor of five. In addition, the pre-built libraries are defined to include workarounds that can overcome certain known errors—rather than halting the testing—which helps improve quick turnaround time, with first time right action. In addition, the pre-built libraries provide for advanced and complex scripting associated the selenium and Appium for handling, for example, dynamic waits, which are simplified with options to override default settings.

Test Execution Module (Scenario Manager and Execution Engine with Robust Interface).

The test execution module provides an interface that enables a non-technical participant to manage/build a test scenario by bringing the modules together to form various test scenarios by associating data at required levels. Such interface also provides the ability to manage the possible environment for execution without scripting while the hybrid engine provides the capability to drive the test execution with a mix of both scripted test driven execution as well as script-less (e.g., keyword driven) execution together as part of the test scenario, which also allows iteration of the flows with various combination of test data without any duplication. In an embodiment, the scenario manager (block 60 FIG. 2 and FIG. 3) will be parsing all the assets created with page object model and creating a catalog of asserts and their respective test modular functionality and test data. The scenario manager also facilitates the user to integrate the modular asserts with a GUI listing of the catalog of asserts created and organized for an integrated scenario as part of the test suite/test plan. The scenario manager also enables the data association at the module as well as for iterative scenarios with distinct data combinations. In another embodiment, the test execution module via the test execution engine is designed to respect the configuration and project-specific customization to define the behavior of the system before all the test, before test, before each module of the test, after each module of the test, after the test and after all tests. In other words, by not limiting to the predefined events as part of the beginning and the ending of a run of scenarios or at each scenario level or at each step level, that too respectively in case of successful completion and failure can be defined or enhanced to the needs of any projects, giving room for flexibility to plug and play.

The test execution engine also drives the execution through the exchange of the data in memory rather by pass by value for each module, thereby easing the integration without any technicality.

Architecture (Ease of Maintenance and Enhancements).

In general, the above-described computer system provides a platform with a loosely coupled architecture to enable the solution to be reused, and is not limiting to Selenium but rather can be usefully applied with any tool or framework. Additionally, the above-described system provides flexibility to interface with any external system with any available Java libraries. In an embodiment, the architecture is provided with the right level of abstraction in place that allows the consumer to enhance and override the preexisting libraries. The architectural design also allows new capabilities to be defined to connect to any external system, and would be inherently consumed by the engine.

Figure 12:
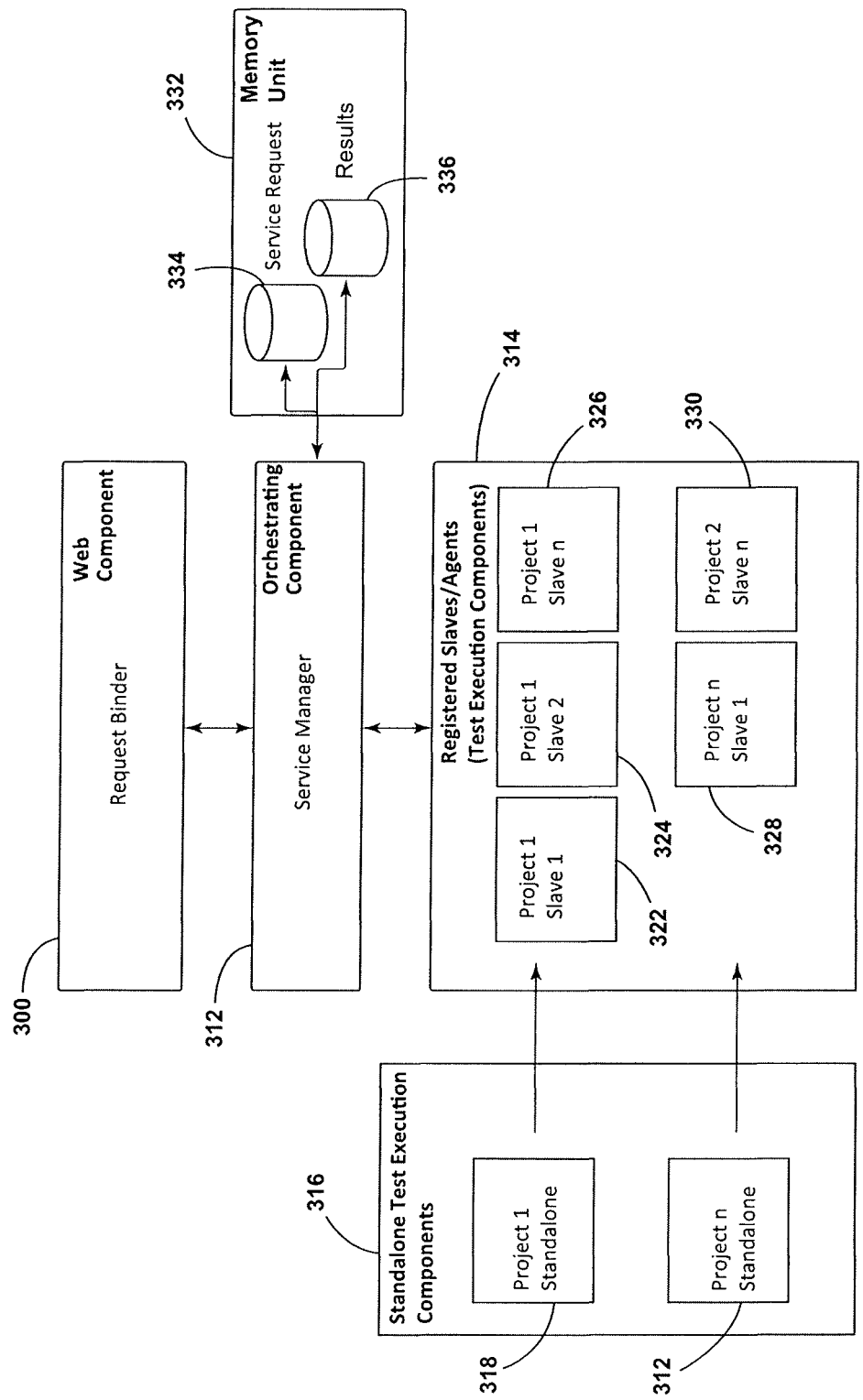
FIGS. 12-13 are block diagram views of a service manager embodiment.
Figure 13:
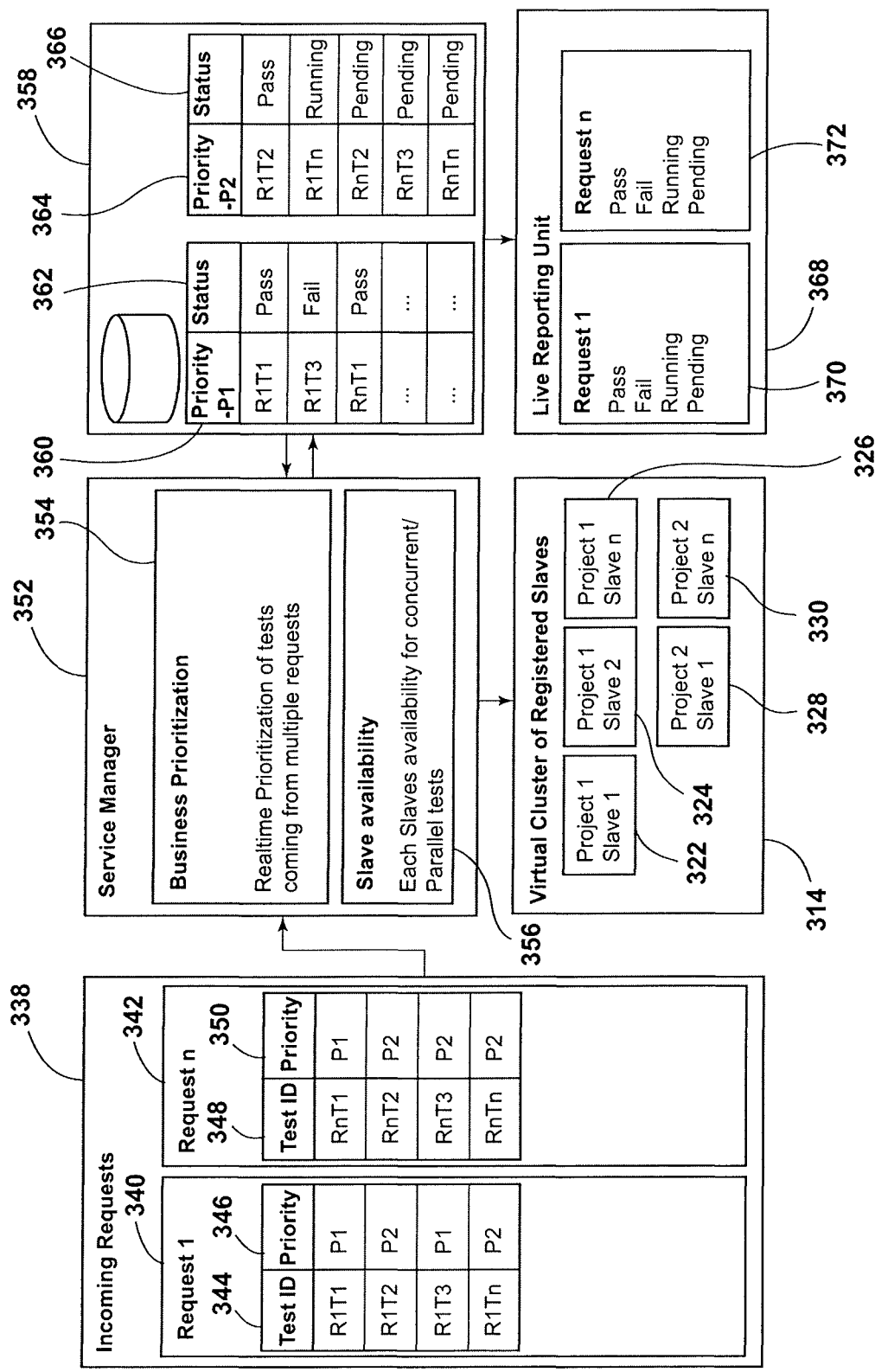

FIGS. 12-13 are block diagrams of a service manager module stored in the memory 24 and configured for execution on the processor 22. The service manager module is configured to enable parallel execution of the testing scenario(s) in a plurality of different computing nodes (computer) to achieve a distribution of the work load. Generally, the system checks if any particular computing node (computer) is free (i.e., available resources likes computing capacity) and routes the requests from an adjacent computing node to an idle computing node, enabling a performance improvement of the test case(s) execution and better overall resource utilization. For example, if there are 100 test cases to be executed in parallel with five computing nodes (e.g., desktop computers), the initial distribution if the overall test case workload can be twenty test cases allocated per each computing node (e.g., desktop computer). In the event that a given computing node has completed execution of its allocated twenty test cases, the service manager module is configured to automatically (i.e., without any user intervention) re-allocate test cases from the other computing nodes to the idle computing node. This re-allocation enables faster completion of the execution of the test cases and achieves a better overall optimization. Overall performance improvement of the test execution is an additional gain.

FIG. 12 shows a request binder (a web component) 300 coupled to a service manager module 312, which is an orchestrating component that helps to integrate the test execution component (see FIG. 1) to build a cluster of computing slaves or agents (sometimes also called computing nodes), designated generally 314. The standalone test execution components 316 may comprise test execution components for a plurality of different projects, such as first project (project 1) standalone, designated 318 through an $n^{th}$ project (project n) standalone, designated 320. The computing slaves or agents could be associated with different projects/programs (and their associated test execution components). In this regard, FIG. 12 shows in exemplary fashion that the first project standalone 318 (i.e., the test execution components associated therewith) may be associated with and distributed among the first, second, and $n^{th}$ computing slaves 322, 324, and 326, respectively. The service manager module 312 is further configured to retrieve and retire service requests 332 stored in a memory unit 332. The service manager module 312 is further configured to store the results in the memory unit 332.

The service manager module 312 is further configured to enable an agile platform to create a computing slave on demand, by which the test execution work load is distributed to be accomplished among the computing slaves. The service manager module 312 is further configured to provide users ability to toggle among the projects to select and instantiate the test, which would be queued to be processed with the computing slaves. The service manager module 312 is further configured for maintaining all the user requests coming from the request binder 300, for example exposed via web technology, and also to report the live execution results. The service manager module 312 is further configured to provision to schedule a specific request subject to time and availability of the test application and its dependencies. Also, rather than processing the request for multiple tests to be run in sequential manner, the service manager module 312 is further configured with inbuilt dynamic ranking mechanism to execute business critical tests cutting across multiple requests with higher precedence over other requests.

FIG. 13 is a block diagram showing a service manager embodiment in greater detail, with an emphasis on request processing. Incoming requests, designated generally at 338, may include first requests 340 and second request 342 (e.g., request n). First requests 340 includes a plurality pairs of test request ID's and associated priorities. Second requests 342 also includes a plurality of pairs of test request ID's and associated priorities. The service manager module 352 (corresponding to module 312) includes business prioritization logic configured to provide real-time prioritization of tests coming for multiple requests. The module 352 further includes logic 356 to identify what computing slaves are available for use in executing the concurrent/parallel tests. FIG. 13 further shows collection of computing slave/agents 314 as in FIG. 12.

The business prioritization logic 354 of service manager module 352 (corresponding to module 312 in FIG. 12) is configured to revise the test order based upon the business priorities. Memory unit 358 (corresponding to memory unit 332 in FIG. 12) contains a revised Test Order with status, for example, in multiple, different queues one for each priority. For example, one queue groups those requests having priority P1, shown as column 360 listing the test request ID's and column 362 containing the associated status(es). Likewise, the logic 354 maintains a second queue that groups those requests having priority P2, again shown as having a column 364 listing the test request ID's and column 366 containing the associated status(es). As shown in FIG. 13, the queue for priority P1 has been completed (i.e., each request has been executed and shows an associated status, e.g., PASS or FAIL). Further, execution begun on the queue with the next highest priority, for example, the queue for priority P2, where execution of the first request R1T2 has been completed (PASS) and the next request in the queue is under execution (i.e., Running), while the remaining requests in list order are pending (i.e., queued up The service manager module 352 (corresponding to module 312 in FIG. 12) is configured to output test results, and in an embodiment, may include a live reporting unit 368 providing a live update of the status of the requests from different projects (e.g., live status for the first request 340). As shown, the live status for the test requests included in the first request 340 (Request 1) are output in block 370 while the live status for the test requests included in the Request n 342 are output in block 372.

Advantages.

Embodiments consistent with the instant disclosure (i) helps functional test automation to be carried out with first time right value thereby eliminating manual errors common with a trial and error approach; (ii) helps testing automation to be carried out in a much more efficient manner and developed in a much faster manner with the use of the first time scripting; (iii) helps to eliminate the relearning of the element properties again and again to greatest extent for the application under test as it undergoes changes from time to time, which is especially true for an application being developed according to the agile model where in the automation, revising scripts based on previous scripts are likely to consume 50-60% of the initial scripting efforts, hence leading to a state where the testing automation team may likely get exhausted within 3-4 sprints, whereas with the instant approach, the maintenance cost may be reduced significantly (e.g., down by 30%) and initial element learning may also be reduced (e.g., reduced by up to 60%); (v) enabled with relative and dynamic XPath further helps to organize the object details within the object repository in the absence of which automation engineers are likely to implement object computation logic with the scripts, which can lead to relatively low productivity, relatively low performance and relatively high maintenance, which is thus not a recommended approach; (vi) reduced failure probability due to auto recalibration feature, which also enables a faster time to market (i.e., in the absence of auto recalibration, there would be failures due to changes in the application under test which in turn can result in element property changes).

It should be understood that an electronic processor configured execute testing automation framework logic as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the testing automation framework logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A computer system comprising:
an electronic processor;
testing automation framework logic stored in a memory for execution by the electronic processor configured to test a main application-under-test by way of a client application in communication with the application-under-test, the testing automation framework logic further including:
an object learning module stored in the memory for execution by the electronic processor configured to parse code describing a web page destined to be rendered by the client application in order to identify predetermined types of elements and associate therewith a respective plurality of identification means, said object learning module being configured to organize the identified elements with the respective, associated identification means as an object set for storage in an object repository;
a test data manager module stored in the memory for execution by the electronic processor and configured to produce a test data set;
a scripting module stored in the memory for execution by the electronic processor and configured to generate at least one script that describes defined test actions with reference to the stored object set and the test data set; and
a test execution module stored in the memory for execution by the electronic processor and configured to execute the at least one script to thereby test the application-under-test wherein the test execution module is configured to use, for at least one element in the object set, a plurality of the associated identification means, the test execution module being configured to generate a report with test results,
wherein an intended element in the object set has a plurality of associated identification means in a first rank order,
wherein the test execution module according to the script, upon a failure to get the intended elements using the first identification means, is configured to increment through remaining identification means associated with the intended element in rank order until the test execution module is successful in getting the intended element,
wherein the test execution module is configured to check for new values for those identification means where the test execution module failed to get the intended element, and
wherein the test execution module is further configured to update the object set with the new values for those identification means where the test execution module failed to get the intended element.

2. The computer system of claim 1, wherein the predetermined types of elements comprise elements in which user input is simulated.

3. The computer system of claim 1 wherein the object learning module is further configured with a user interface that allows a user to designate a desired element on the web page to thereby define a spied element, wherein the object learning module is further configured to automatically determine attributes of the spied element.

4. The computer system of claim 3 wherein the object learning module is further configured to validate each of the attributes of the spied element for uniqueness on the web page.

5. The computer system of claim 4 wherein the object learning module is further configured to set or reset, for each of the attributes of the spied element, a respective uniqueness flag.

6. The computer system of claim 4, wherein the user interface of the object learning module is further configured to allow the user to select, for the spied element, a plurality of attributes in combination so as to produce a multi-conditioned locator.

7. The computer system of claim 6 wherein the multi-conditioned locator comprises an XPath descriptor.

8. The computer system of claim 1 wherein the object learning module is further configured with a user interface configured to receive from a user at least one search criteria selected from (i) a keyword and (ii) an exact value associated with an attribute of an element, wherein said object learning module is further configured to parse the code of the web page and output a listing of all elements thereof meeting the search criteria, and wherein the object learning module is further configured to denote a respective uniqueness on the web page for each attribute of each listed element.

9. The computer system of claim 8, wherein the user interface of the object learning module is configured to receive from the user a selection of a region of the web page designating which elements to analyze, and wherein the object learning module is configured to determine the user designated elements.

10. The computer system of claim 1,
wherein the test data manager module is configured to establish a hierarchy comprising a global level, scenario level, and a step level, and
wherein the test execution module is configured to enforce the hierarchy during execution of the test.

11. The computer system of claim 1 wherein the code describing the web page comprises a first code, and wherein the scripting module is configured to automatically parse the first code describing the web page to generate a second code reflecting the page elements and user actions to thereby form the script that is configured to drive the execution of the test.

12. The computer system of claim 11 wherein the web page is a first web page and the script is a first script, further comprising a second web page, wherein the scripting module is configured to automatically parse the first code associated with the second web page to generate second code reflecting the page elements and user actions associated with the second web page thereby defining a second script, the first and second scripts being separate so as to define modular scripts.

13. The computer system of claim 1, wherein the memory further comprises a scripting module which, when executed by the processor, causes the processor to record user steps interacting with said web page in a script-less fashion, wherein said test execution manager is configured to playback said recorded steps during testing.

14. The computer system of claim 1, wherein the memory further comprises a service manager module which, when executed by the processor, causes the processor to convert said recorded steps into Business Process Model and Notation (BPMN) standard notation.

15. The computer system of claim 1, wherein the memory further comprises a service manager module configured to enable parallel execution in a plurality of different computing nodes with dynamic work load distribution to one or more of the plurality of different computing nodes.

16. The computer system of claim 1, wherein the object learning module is further configured to perform auto recalibration to automatically learn the elements in said code without user input or intervention.

\* \* \* \* \*